US012687860B2

(12) United States Patent
Bomleny et al.

(10) Patent No.: US 12,687,860 B2
(45) Date of Patent: Jul. 21, 2026

(54) HARVEST READINESS DETERMINATION USING DRONE WITH CROP ENGAGING COMPONENT

(71) Applicant: Deere & Company, Moline, IL (US)

(72) Inventors: Duane M. Bomleny, Geneseo, IL (US);
Scott N. Clark, Bettendorf, IA (US);
Nathan R. Vandike, Geneseo, IL (US);
Bradley K. Yanke, Eldridge, IA (US)

(73) Assignee: Deere & Company, Moline, IL (US)

( * ) Notice: Subject to any disclaimer, the term of this patent is extended or adjusted under 35 U.S.C. 154(b) by 123 days.

(21) Appl. No.: 18/767,735

(22) Filed: Jul. 9, 2024

(65) Prior Publication Data

US 2026/0016837 A1     Jan. 15, 2026

(51) Int. Cl.
| | |
|---|---|
| *G05D 1/689* | (2024.01) |
| *G06Q 50/02* | (2012.01) |
| *G05D 105/15* | (2024.01) |
| *G05D 105/80* | (2024.01) |
| *G05D 107/20* | (2024.01) |
| *G05D 109/20* | (2024.01) |

(52) U.S. Cl.
CPC ............. *G05D 1/689* (2024.01); *G06Q 50/02* (2013.01); *G05D 2105/15* (2024.01); *G05D 2105/80* (2024.01); *G05D 2107/21* (2024.01); *G05D 2109/20* (2024.01)

(58) Field of Classification Search
CPC .............. G05D 1/689; G05D 2105/15; G05D 2109/20; G05D 2107/21; G05D 2105/80; G06Q 50/02
See application file for complete search history.

(56) References Cited

U.S. PATENT DOCUMENTS

| | | | |
|---|---|---|---|
| 7,721,515 B2 | 5/2010 | Pollklas et al. | |
| 8,666,552 B2 * | 3/2014 | Zeelen ................... | A01D 46/30 |
| | | | 901/47 |
| 8,909,389 B2 | 12/2014 | Meyer | |
| 9,050,890 B2 | 6/2015 | Buerkle et al. | |
| 9,382,003 B2 * | 7/2016 | Burema ................ | B64U 10/00 |
| 9,447,448 B1 * | 9/2016 | Kozloski ................. | B64D 1/22 |
| 9,740,208 B2 | 8/2017 | Sugumaran et al. | |

(Continued)

FOREIGN PATENT DOCUMENTS

| | | |
|---|---|---|
| CN | 113287422 A | 8/2021 |
| DE | 102014201203 A1 | 7/2015 |

(Continued)

*Primary Examiner* — Ramsey Refai
(74) *Attorney, Agent, or Firm* — Christopher J. Volkmann; KELLY, HOLT & CHRISTENSON PLLC

(57) ABSTRACT

An agricultural system includes a drone controllable to exert force on a crop plant at a worksite, one or more harvest readiness sensors configured to detect one or more harvest readiness attributes after exertion of force on the crop plant and to generate harvest readiness sensor data indicative of the one or more harvest readiness attributes. The system further includes one or more processors and memory storing instructions, executable by the one or more processors. The instructions, when executed by the one or more processors, cause the one or more processors to control the drone to exert force on the crop plant and identify a harvest readiness values corresponding to the worksite based on the harvest readiness sensor data.

21 Claims, 16 Drawing Sheets

(56) References Cited

U.S. PATENT DOCUMENTS

| | | | |
|---|---|---|---|
| 9,792,557 B2* | 10/2017 | Mathur | G06N 7/01 |
| 9,807,933 B2 | 11/2017 | Boyd et al. | |
| 9,829,883 B1 | 11/2017 | Lavoie et al. | |
| 10,049,296 B2 | 8/2018 | Walker | |
| 10,189,568 B2* | 1/2019 | O'Connor | A01B 79/005 |
| 10,255,670 B1 | 4/2019 | Wu et al. | |
| 10,377,197 B2 | 8/2019 | Fukatsu et al. | |
| 10,555,460 B2* | 2/2020 | Bhavani | A01D 46/24 |
| 10,721,859 B2 | 7/2020 | Wu et al. | |
| 10,754,353 B2 | 8/2020 | Sporrer et al. | |
| 10,761,544 B2 | 9/2020 | Anderson et al. | |
| 10,766,617 B2* | 9/2020 | Gwin | B25J 9/1085 |
| 10,872,417 B1* | 12/2020 | Yablonski | G06T 5/50 |
| 11,017,306 B2 | 5/2021 | Sood et al. | |
| 11,112,262 B2 | 9/2021 | Anderson | |
| 11,194,348 B2* | 12/2021 | Maor | G06T 5/50 |
| 11,212,964 B2* | 1/2022 | Bhavani | A01D 46/30 |
| 11,308,735 B2 | 4/2022 | Wagner et al. | |
| 11,324,164 B2 | 5/2022 | Sorensen | |
| 11,373,399 B2* | 6/2022 | Lindberg | G06V 20/13 |
| 11,470,776 B2 | 10/2022 | Barther et al. | |
| 11,483,972 B2 | 11/2022 | Dima et al. | |
| 11,499,295 B2 | 11/2022 | Anderson | |
| 11,526,179 B2* | 12/2022 | Maor | G06F 16/29 |
| 11,609,159 B2* | 3/2023 | Orol | B64U 80/70 |
| 11,758,844 B2 | 9/2023 | White et al. | |
| 12,284,949 B2* | 4/2025 | Romar | B64U 10/16 |
| 2006/0020402 A1 | 1/2006 | Bischoff et al. | |
| 2006/0196158 A1 | 9/2006 | Faivre et al. | |
| 2007/0125155 A1* | 6/2007 | Barreiro | A01G 7/06 |
| | | | 417/279 |
| 2012/0029732 A1 | 2/2012 | Meyer | |
| 2016/0019560 A1 | 1/2016 | Benkert et al. | |
| 2016/0202227 A1* | 7/2016 | Mathur | A01B 79/005 |
| | | | 702/2 |
| 2016/0364989 A1* | 12/2016 | Speasl | G08G 5/32 |
| 2017/0094909 A1* | 4/2017 | Bhavani | A01D 46/30 |
| 2017/0096222 A1* | 4/2017 | Spinelli | B64U 80/25 |
| 2018/0325014 A1 | 11/2018 | Debbaut | |
| 2018/0335372 A1* | 11/2018 | Orol | G01N 1/08 |
| 2018/0364157 A1* | 12/2018 | Ghiraldi | A01C 21/007 |
| 2019/0113936 A1 | 4/2019 | Anderson et al. | |
| 2019/0227554 A1 | 7/2019 | Cantrell et al. | |
| 2020/0134485 A1 | 4/2020 | Sood et al. | |
| 2020/0264154 A1 | 8/2020 | Saez et al. | |
| 2021/0097632 A1 | 4/2021 | Xu et al. | |
| 2021/0342719 A1 | 11/2021 | Sood et al. | |
| 2021/0357664 A1 | 11/2021 | Kocer et al. | |
| 2022/0046859 A1 | 2/2022 | Maor et al. | |
| 2022/0113734 A1 | 4/2022 | Vandike et al. | |
| 2022/0138868 A1 | 5/2022 | Jarugumilli et al. | |
| 2022/0232770 A1 | 7/2022 | Yanke et al. | |
| 2022/0348322 A1 | 11/2022 | Zemenchik | |
| 2023/0000015 A1 | 1/2023 | Todd et al. | |
| 2023/0345873 A1 | 11/2023 | Jorre et al. | |
| 2024/0087055 A1* | 3/2024 | Prendergast, Jr. | H04L 67/125 |
| 2024/0130280 A1 | 4/2024 | Ganssle | |
| 2025/0245984 A1* | 7/2025 | Melnitchouck | G06Q 10/04 |
| 2025/0315759 A1* | 10/2025 | Buckland | G06N 3/084 |

FOREIGN PATENT DOCUMENTS

| | | |
|---|---|---|
| DE | 102015224175 B3 | 4/2017 |
| DE | 102016202628 A1 | 8/2017 |
| EP | 2545761 B1 | 12/2016 |
| EP | 3401854 A1 | 11/2018 |
| EP | 3284334 B1 | 4/2019 |
| EP | 3552474 B1 | 8/2021 |
| IN | 202241068395 A | 2/2022 |
| JP | 2021058099 A | 4/2021 |
| WO | 2023021005 A1 | 2/2023 |
| WO | 2023047240 A1 | 3/2023 |
| WO | 2023187494 A1 | 10/2023 |

* cited by examiner

FIG. 5B

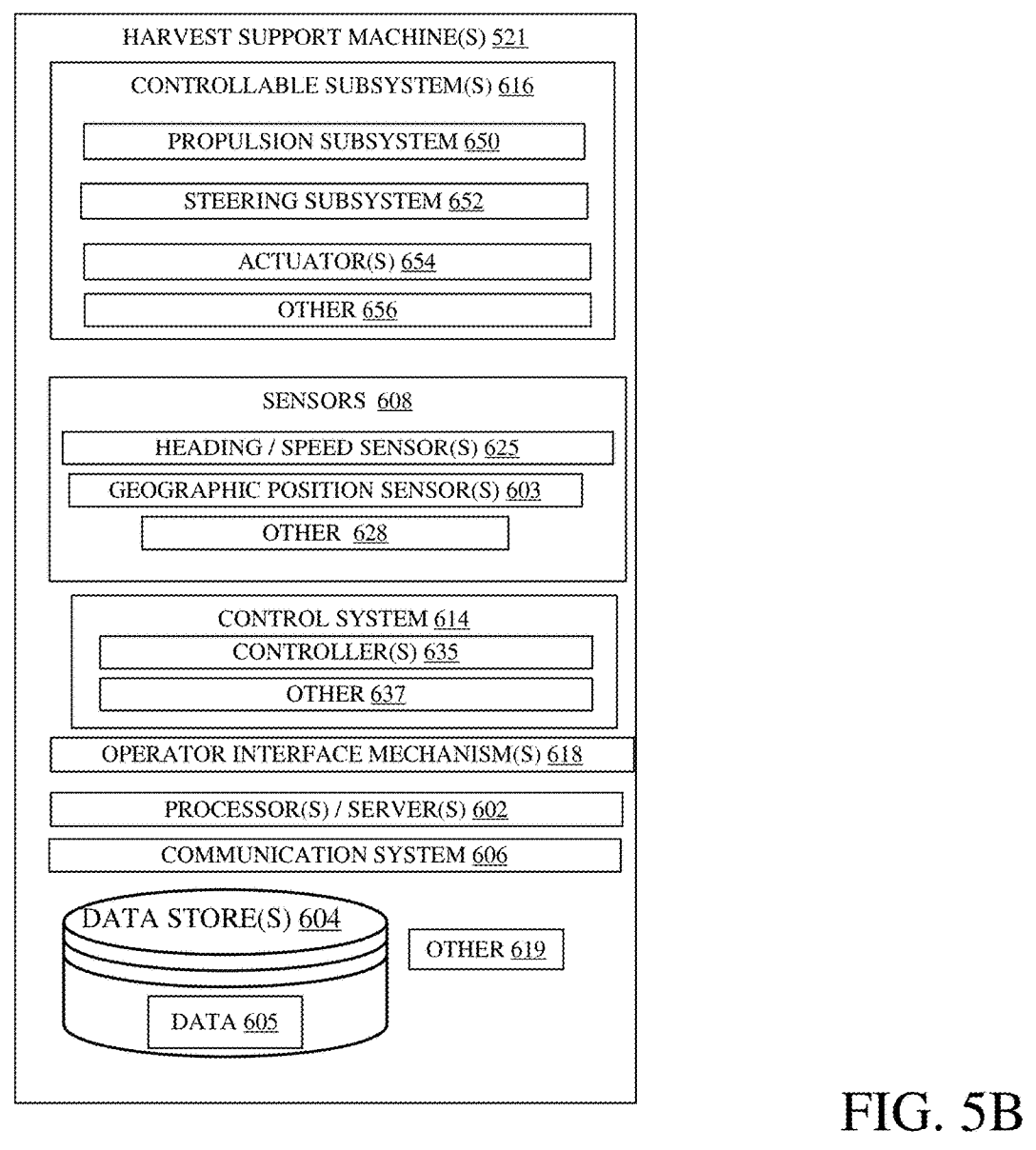

HARVEST SUPPORT MACHINE(S) 521

CONTROLLABLE SUBSYSTEM(S) 616

PROPULSION SUBSYSTEM 650

STEERING SUBSYSTEM 652

ACTUATOR(S) 654

OTHER 656

SENSORS 608

HEADING / SPEED SENSOR(S) 625

GEOGRAPHIC POSITION SENSOR(S) 603

OTHER 628

CONTROL SYSTEM 614

CONTROLLER(S) 635

OTHER 637

OPERATOR INTERFACE MECHANISM(S) 618

PROCESSOR(S) / SERVER(S) 602

COMMUNICATION SYSTEM 606

OTHER 619

DATA STORE(S) 604

DATA 605

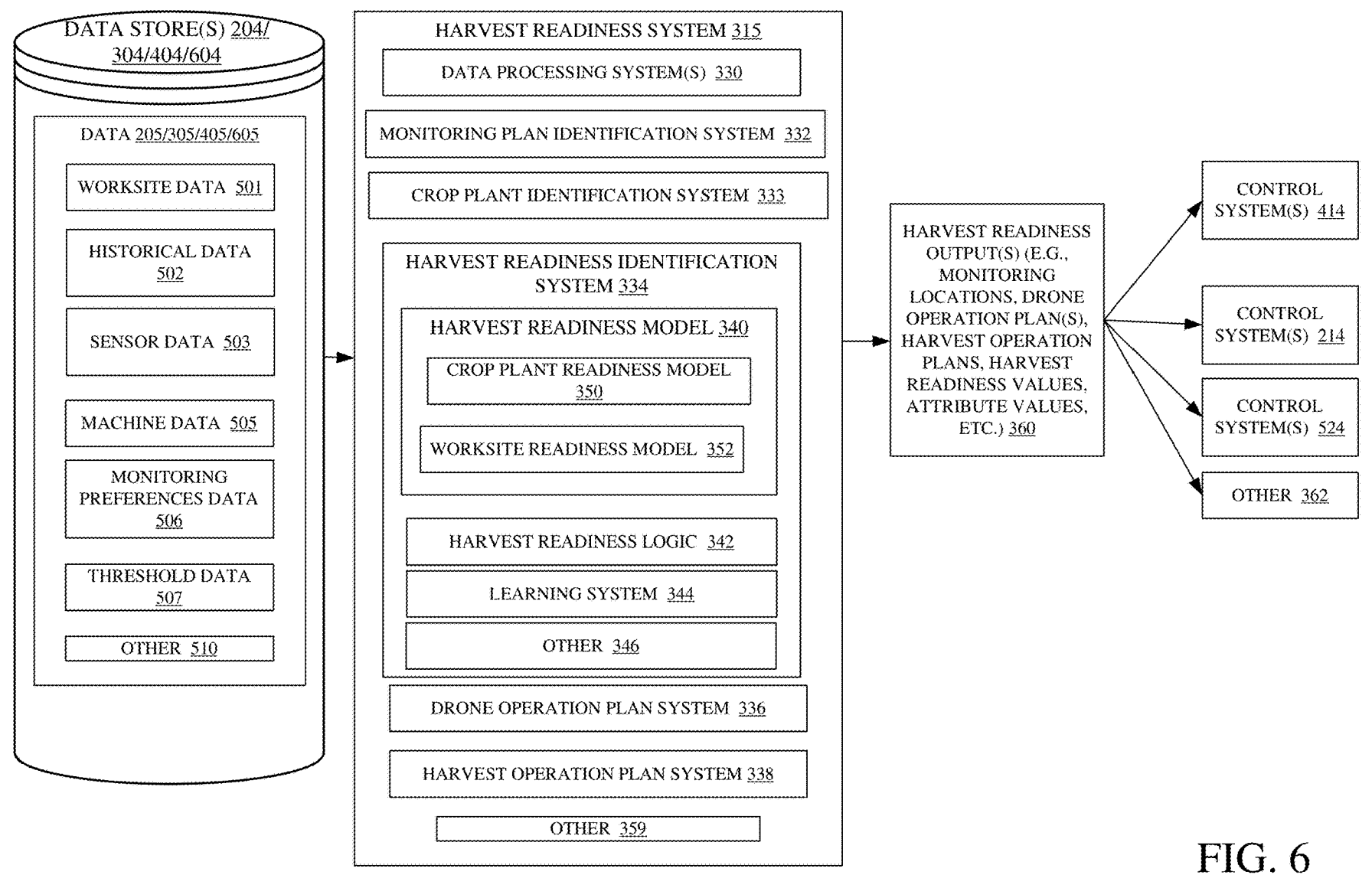

CONTROL SYSTEM(S) 414

CONTROL SYSTEM(S) 214

CONTROL SYSTEM(S) 524

OTHER 362

HARVEST READINESS OUTPUT(S) (E.G., MONITORING LOCATIONS, DRONE OPERATION PLAN(S), HARVEST OPERATION PLANS, HARVEST READINESS VALUES, ATTRIBUTE VALUES, ETC.) 360

HARVEST READINESS SYSTEM 315

DATA PROCESSING SYSTEM(S) 330

MONITORING PLAN IDENTIFICATION SYSTEM 332

CROP PLANT IDENTIFICATION SYSTEM 333

HARVEST READINESS IDENTIFICATION SYSTEM 334

HARVEST READINESS MODEL 340

CROP PLANT READINESS MODEL 350

WORKSITE READINESS MODEL 352

HARVEST READINESS LOGIC 342

LEARNING SYSTEM 344

OTHER 346

DRONE OPERATION PLAN SYSTEM 336

HARVEST OPERATION PLAN SYSTEM 338

OTHER 359

DATA STORE(S) 204/ 304/404/604

DATA 205/305/405/605

WORKSITE DATA 501

HISTORICAL DATA 502

SENSOR DATA 503

MACHINE DATA 505

MONITORING PREFERENCES DATA 506

THRESHOLD DATA 507

OTHER 510

FIG. 6

Figure 7A:
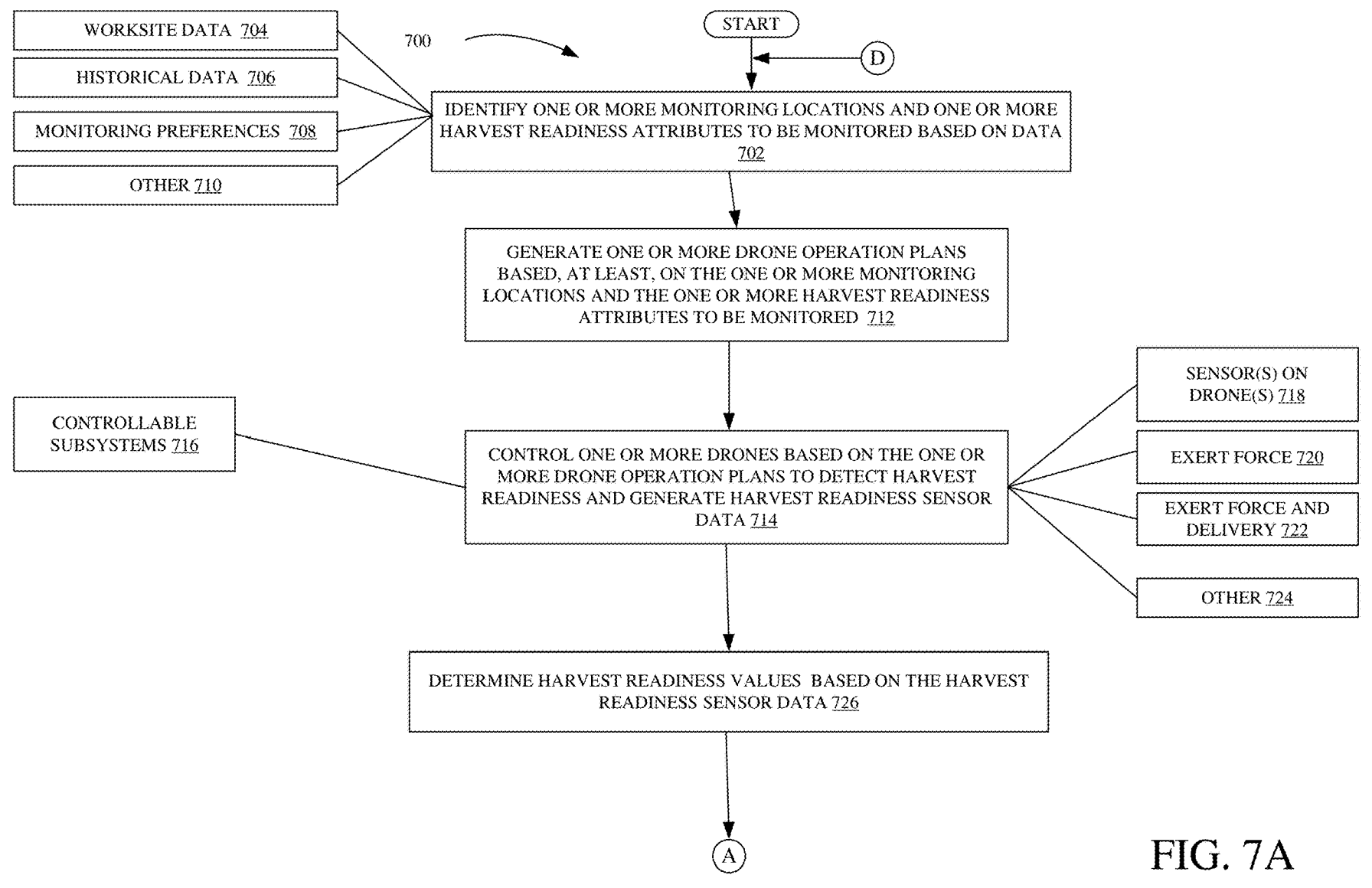

START

D

700

IDENTIFY ONE OR MORE MONITORING LOCATIONS AND ONE OR MORE HARVEST READINESS ATTRIBUTES TO BE MONITORED BASED ON DATA 702

WORKSITE DATA 704

HISTORICAL DATA 706

MONITORING PREREFERENCES 708

OTHER 710

GENERATE ONE OR MORE DRONE OPERATION PLANS BASED, AT LEAST, ON THE ONE OR MORE MONITORING LOCATIONS AND THE ONE OR MORE HARVEST READINESS ATTRIBUTES TO BE MONITORED 712

CONTROL ONE OR MORE DRONES BASED ON THE ONE OR MORE DRONE OPERATION PLANS TO DETECT HARVEST READINESS AND GENERATE HARVEST READINESS SENSOR DATA 714

CONTROLLABLE SUBSYSTEMS 716

SENSOR(S) ON DRONE(S) 718

EXERT FORCE 720

EXERT FORCE AND DELIVERY 722

OTHER 724

DETERMINE HARVEST READINESS VALUES BASED ON THE HARVEST READINESS SENSOR DATA 726

CONTROLLABLE SUBSYSTEM(S) 732

INTERFACE MECHANISM(S) 734

OTHER 736

GENERATE ONE OR MORE HARVEST OPERATION PLANS BASED, AT LEAST, ON THE HARVEST READINESS VALUES 728

CONTROL ONE OR MORE HARVESTERS BASED, AT LEAST, ON THE ONE OR MORE HARVEST OPERATION PLANS 730

DETECT ATTRIBUTE VALUES DURING HARVESTING OPERATION AND PERFORM LEARNING 738

A

HARVEST READINESS DETERMINATION USING DRONE WITH CROP ENGAGING COMPONENT

FIELD OF THE DESCRIPTION

The present description relates to agricultural worksite operations. More specifically, the present description relates to drone-based remote monitoring and control of agricultural worksite operations, such as an agricultural harvesting operation.

BACKGROUND

There are a wide variety of different types of agricultural worksite operations. During an agricultural worksite operation, one or more agricultural work machines operate at a worksite, which can include one or more fields, to carry out the operation. The one or more agricultural work machines can be controlled during the operation based on attributes detected at the worksite. On example of an agricultural worksite operation is an agricultural harvesting operation. During an agricultural harvesting operation, one or more agricultural harvesting machines harvest crop at the worksite.

The discussion above is merely provided for general background information and is not intended to be used as an aid in determining the scope of the claimed subject matter.

SUMMARY

An agricultural system includes a drone controllable to exert force on a crop plant at a worksite, one or more harvest readiness sensors configured to detect one or more harvest readiness attributes after exertion of force on the crop plant and to generate harvest readiness sensor data indicative of the one or more harvest readiness attributes. The system further includes one or more processors and memory storing instructions, executable by the one or more processors. The instructions, when executed by the one or more processors, cause the one or more processors to control the drone to exert force on the crop plant and identify a harvest readiness values corresponding to the worksite based on the harvest readiness sensor data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 5A and 5B show a block diagram of one example agricultural harvesting system architecture.

FIG. 6 is a block diagram showing some examples of components of the agricultural harvesting system architecture, including a harvest readiness monitoring system, in more detail.

FIGS. 7A and 7B (collectively referred to herein as FIG. 7) show a flow diagram illustrating one example operation of an agricultural harvesting system architecture in performing harvest readiness monitoring and machine control.

DETAILED DESCRIPTION

Figure 1:
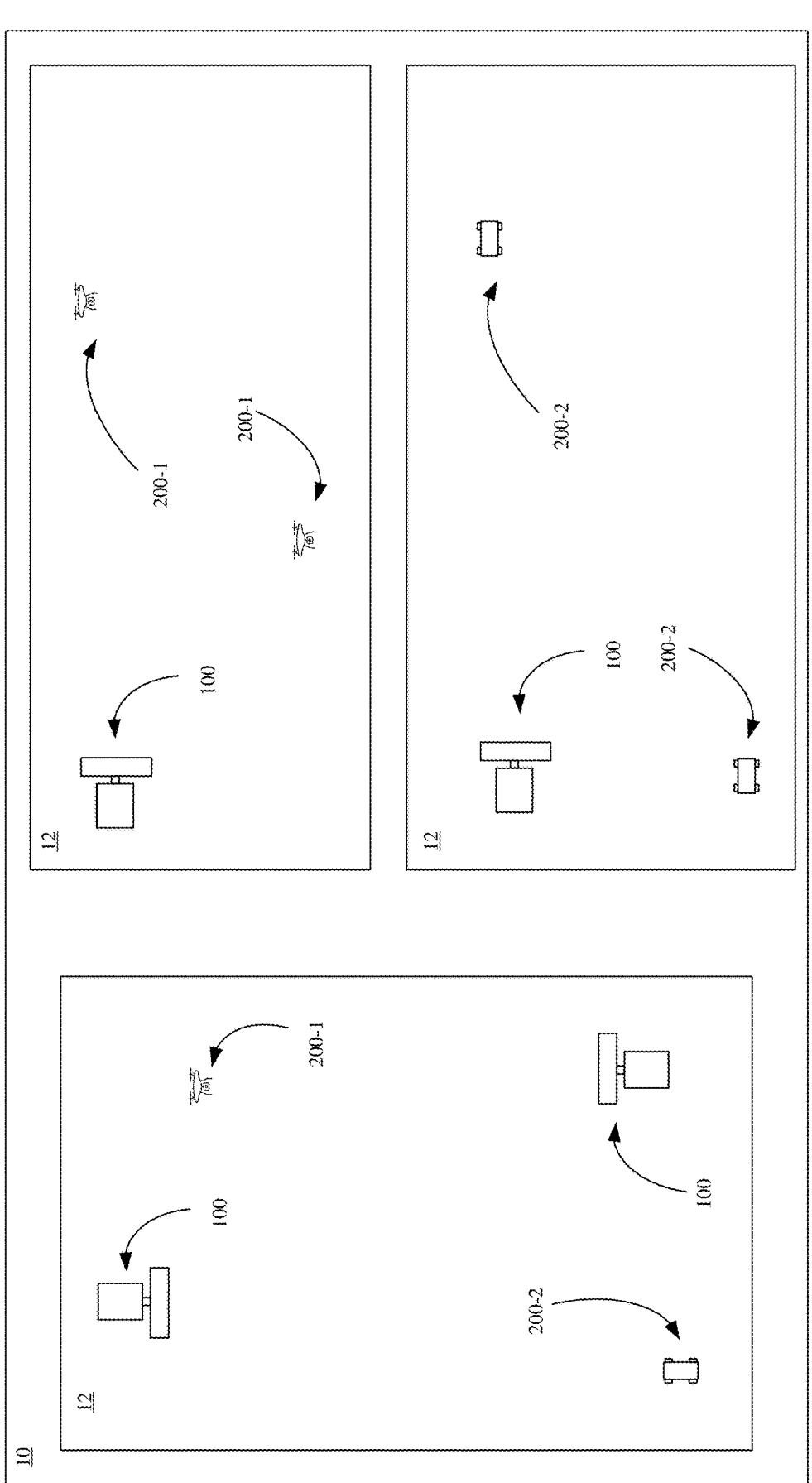
FIG. 1 is a pictorial illustration showing an example agricultural worksite.

For the purpose of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example can be combined with the features, components, and/or steps described with respect to other examples of the present disclosure.

During an agricultural harvesting operation, one or more agricultural harvesting machines operate at a worksite (e.g., one or more fields) to harvest crop. Operating parameters (e.g., machine settings, route, etc.) of the agricultural harvesting machine (hereinafter also referred to as harvester) can be controlled, during the harvesting operation, based on attributes detected at the worksite. One example attribute is harvest readiness. Harvest readiness describes the readiness of the worksite (worksite readiness) and of the crop plants at the worksite (crop plant readiness) to be harvested.

Worksite readiness describes the readiness of the worksite to be harvested. Worksite readiness can be determined based on a number of worksite readiness attributes, such as soil attributes (e.g., soil moisture, etc.), presence and location of worksite features (e.g., features affecting worksite accessibility and traversability, such as free-standing water) at the worksite, weather at the worksite (e.g., precipitation type and levels, etc.), as well as various other worksite readiness attributes. For instance, whether harvesters can operate at the worksite without causing damage (e.g., compaction, ruts, etc.) or getting stuck, such as due to soil attributes, whether harvesters can access and traverse the field given the presence and location of worksite features, and whether the weather at the worksite will affect the operation of the harvesters, can all be considered in determining worksite readiness, and thus, harvest readiness.

Crop plant readiness describes the readiness of crop plants, at the worksite, to be harvested. Crop plant, as used herein, refers to the entirety of the crop plant which includes both the commodity (e.g., material to be harvested, such as grain, etc.) and material other than the commodity (where the commodity is grain, material other than the commodity is sometimes also referred to as material other than grain (MOG)). Crop plant readiness can be determined based on a number of crop plant readiness attributes, such as crop plant state (e.g., crop lodging, whether the crop plant is standing or lodged (e.g., downed or leaning)), crop plant type (e.g., species, hybrid, cultivar, etc.), crop plant color (e.g., commodity color or MOG color, or both), crop plant moisture (e.g., commodity moisture or MOG moisture, or both), crop plant health, crop plant maturity (e.g., crop plant moisture crop plant color, crop plant health, commodity position or orientation (e.g., ears upright or hanging down, etc.), commodity exposure (e.g., ear husk peeled back exposing grains, etc.)), crop plant mechanics (e.g., crop plant toughness, breakability of the crop plant, shatterability of the crop plant, etc.), crop plant constituents (e.g., concentration levels of various constituents such as protein, starch, oil, etc.), crop plant biomass, crop plant size (e.g., height, length, width, diameter, etc.), crop plant weight (e.g., weight of commodity or weight of MOG, or both), crop plant temperature, pest presence on or near the crop plants, disease/fungal presence on or near the crop plants, crop loss, weed attributes (e.g., presence and intensity of weeds near (i.e., in the harvesting path of) the crop plants, as well as various other attributes.

In some current systems, a grower can have multiple fields at which harvesting is to be conducted. Generally, and ideally, crop is harvested when crop is at an ideal level of crop readiness. Crop readiness can include a given moisture range. For example, growers are paid by volume (e.g., per bushel). Often, buyers (e.g., mill, etc.) demand a moisture range or a maximum level a moisture (e.g., 15% for corn, 13% for soybean, etc.). Crop that is delivered to the buyer outside of the moisture range or above the maximum will be discounted in price, reducing the grower's profit. Crop readiness can include a toughness or hardness. For example, crop that is not ready can be damaged when processed by a harvester, which can result in crop loss or in reduced profit. Crop readiness can include constituent levels (e.g., concentrations of constituents such as starch, protein, oil, etc.). For instance, a grower can receive price premiums for crop having given constituent levels and crop with given constituent levels can be more beneficial as feed for livestock owned by the grower. Crop readiness can include various other attributes.

It can be difficult for a grower to determine when crop is ready for harvesting and which fields to begin harvesting. In some current systems, a grower can go to a field to observe and sample crop. However, this can be time consuming, and the sampling methodology cannot lead to an accurate synopsis of the readiness of the entire field.

Further, even when crop plants are ready, a worksite may be unready for harvest. For example, there can be obstacles at the worksite which can hamper or prevent harvesting. Further, the soil conditions can lead to damage (e.g., compaction, ruts, etc.) or other deleterious effects (e.g., machines getting stuck) if traversed. These worksite readiness attributes can be difficult for a grower to determine prior to harvesting as the standing crop at the field can impact the ability of the grower to observe the attributes.

Disclosed herein are systems and methods for detecting harvest readiness, remotely from the harvesters, in areas not yet harvested, and determining harvest readiness. Harvest readiness can be remotely detected utilizing drones, such as by utilizing harvest readiness sensors on-board the drones or by controlling the drones to collect samples to be tested by one or more harvest readiness sensors off-board the drones. The detected harvest readiness can be used to control one or more harvesters.

FIG. 1 is a pictorial illustration showing one example worksite 10 that includes a plurality of fields 12. As shown a plurality of drones 200 (illustratively UAVs 200-1 and UGVs 200-2) can be deployed at the worksite to detect harvest readiness. Further, as illustrated, a plurality of harvesters 100 can be deployed at the worksite to harvest crop at the worksite. It will be noted that the drones 200 can be deployed at the worksite ahead of the harvesters 100 or can be deployed at the worksite at the same time as the harvesters 100, or both.

Figure 2:
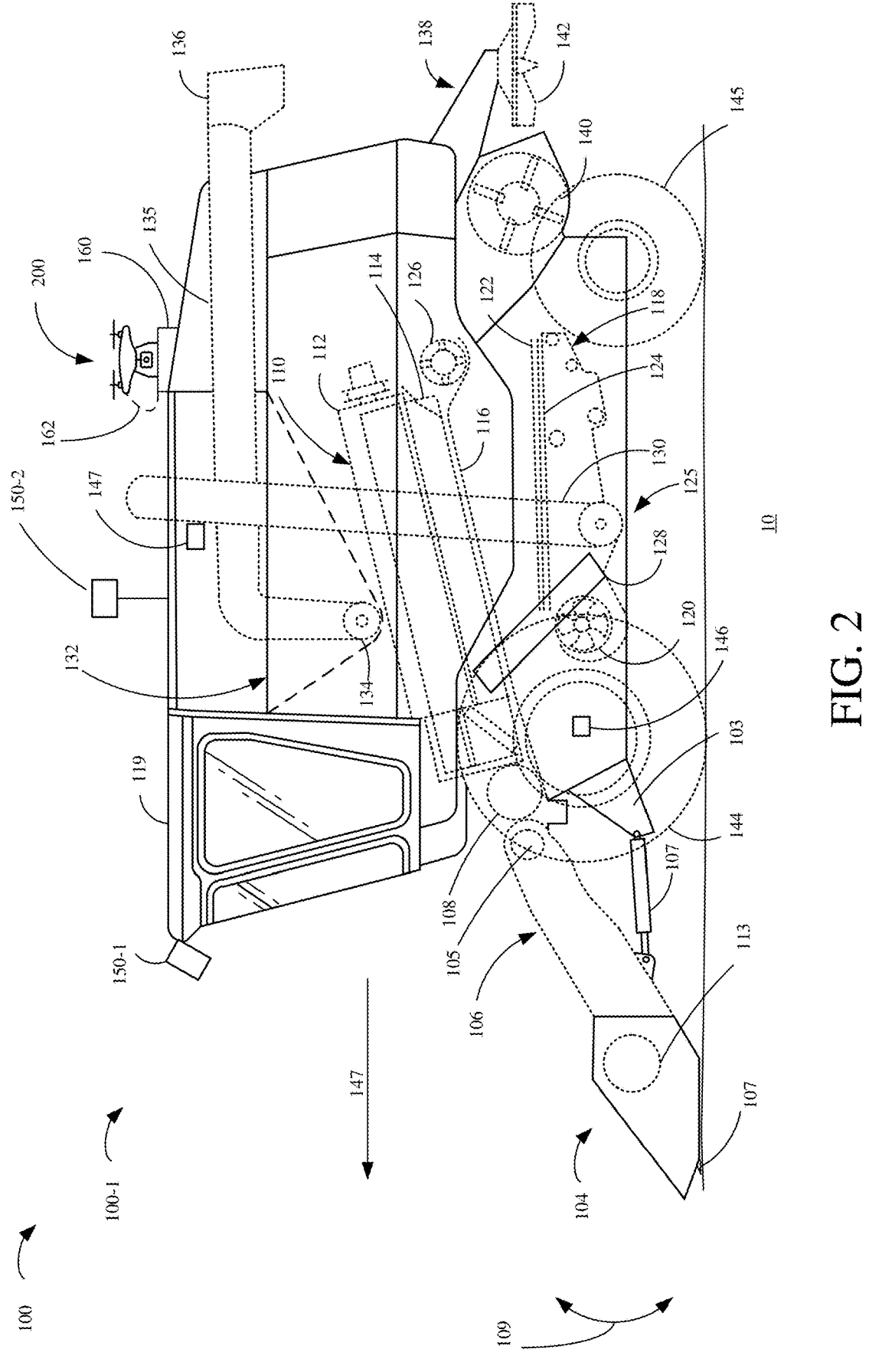
FIG. 2 is a partial pictorial, partial schematic illustration showing an example agricultural work machine in the form of an agricultural harvester.

FIG. 2 is partial pictorial, partial schematic illustration of an example agricultural harvester 100 in the form of a combine harvester 100-1. As illustrated in FIG. 2, harvester 100-1 includes ground engaging traction elements (wheels or tracks) 144 and 145 which can be driven by a propulsion subsystem (e.g., internal combustion engine, electric motors, hydrostatic drive, and other drivetrain elements, such as a gear box) to propel harvester 100 across a worksite 10 (e.g., a field). Harvester 100-1 includes an operator compartment or cab 119, which can include a variety of different operator interface mechanisms (e.g., 418 shown in FIG. 5) for controlling harvester 100-1 as well as for presenting (e.g., displaying, etc.) various information. Harvester 100-1 includes a feeder house 106, a feed accelerator 108, and a thresher generally indicated at 110. The feeder house 106 and the feed accelerator 108 form part of a material handling subsystem 125. Header 104 is pivotally coupled to a frame 103 of harvester 100-1 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 2, agricultural harvester 100-1 can also include one or more actuators that operate to apply a tilt angle, a roll angle, or both to the header 104 or portions of header 104.

Agricultural harvester 100-1 includes a material handling subsystem 125 that includes a thresher 110 which illustratively includes a threshing rotor 112 and a set of concaves 114. Further, material handling subsystem 125 also includes a separator 116. Agricultural harvester 100-1 also includes a cleaning subsystem or cleaning shoe (collectively referred to as cleaning subsystem 118) that includes cleaning fan(s) 120, chaffer 122, and sieve 124. The material handling subsystem 125 also includes discharge beater 126, tailings elevator 128, and clean grain elevator 130. The clean grain elevator moves clean grain into a material receptacle (or clean grain tank) 132.

Harvester 100-1 also includes a material transfer subsystem that includes a conveying mechanism 134 and a chute 135. Chute 135 includes a spout 136. In some examples, spout 136 can be movably coupled to chute 135 such that spout 136 can be controllably rotated to change the orientation of spout 136. Conveying mechanism 134 can be a variety of different types of conveying mechanisms, such as an auger or blower. Conveying mechanism 134 is in communication with clean grain tank 132 and is driven (e.g., by an actuator, such as motor or engine) to convey material from grain tank 132 through chute 135 and spout 136. Chute 135 is rotatable through a range of positions from a storage position (shown in FIG. 2) to a variety of deployed positions away from agricultural harvester 100-1 to align spout 136 relative to a material receptacle of a material receiving machine that is configured to receive the material within grain tank 132. One example of such a deployed position is shown in FIG. 1. Spout 136, in some examples, is also rotatable, by an actuator, to adjust the direction of the material stream exiting spout 136.

Harvester 100-1 also includes a residue subsystem 138 that can include chopper and spreader 142. In some examples, a harvester within the scope of the present disclosure can have more than one of any of the subsystems mentioned above. In some examples, harvester 100-1 can have left and right cleaning subsystems, separators, etc., which are not shown in FIG. 1.

In operation, and by way of overview, harvester 100-1 illustratively moves through a field 10 in the direction indicated by arrow 147. As harvester 100-1 moves, header 104 engages the crop plants to be harvested and cuts, with a cutter bar 107 on the header 104, the crop plants to generate cut crop material.

The cut crop material is engaged by a cross auger 113 which conveys the severed crop material to a center of the header 104 where the severed crop material is then moved through an opening to a conveyor in feeder house 106 toward feed accelerator 108, which accelerates the severed crop material into thresher 110. The severed crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100-1 in a windrow.

Grain falls to cleaning subsystem 118. Chaffer 122 separates some larger pieces of MOG from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by one or more cleaning fans 120. Cleaning fans 120 direct air along an airflow path upwardly through the sieves and chaffers. The airflow carries residue rearwardly in harvester 100-1 toward the residue handling subsystem 138.

Tailings elevator 128 returns tailings to thresher 110 where the tailings are re-threshed. Alternatively, the tailings also can be passed to a separate re-threshing mechanism by a tailings elevator or another transport device where the tailings are re-threshed as well.

Harvester 100-1 can include a variety of sensors, some of which are illustrated in FIG. 1, such as ground speed sensor 146, one or more mass flow sensors 147, and one or more crop loss sensor systems 150.

Ground speed sensor 146 senses the travel speed of harvester 100-1 over the ground. Ground speed sensor 146 can sense the travel speed of the harvester 100-1 by sensing the speed of rotation of the ground engaging traction elements 144 or 145, or both, a drive shaft, an axle, or other components. In some instances, the travel speed can be sensed using a positioning system, such as a global positioning system (GPS), a dead reckoning system, a long-range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when harvester 100-1 is on a slope, the orientation of harvester 100-1 relative to the slope is known. For example, an orientation of harvester 100-1 could include ascending, descending or transversely travelling the slope.

Mass flow sensors 147 sense the mass flow of material (e.g., grain) through clean grain elevator 130. Mass flow sensors 147 can be disposed at various locations, such as within or at the outlet of clean grain elevator 130. In some examples, the mass flow rate of material sensed by mass flow sensors 147 is used in the calculation of yield as well as in the calculation of the fill level of the on-board material tank 132. In some examples, mass flow sensors 147 include an impact (or strike) plate that is impacted by material (e.g., grain) conveyed by clean grain elevator 130 and a force or load sensor that detects the force or load of impact of the material on the impact (or strike) plate. This is merely one example of a mass flow sensor.

Observation sensor systems 150 can include one or more of a variety of sensors, such as cameras (e.g., mono cameras, stereo cameras, color (e.g. RGB) cameras, multispectral cameras, thermal camera, infrared cameras, near-infrared cameras, etc.), lidar sensors, radar sensors, terahertz sensors as well as various other sensor configured to emit and/or receive electromagnetic radiation, ultrasonic sensors, as well as a variety of other sensors. Observation sensor systems 150 can illustratively detect various attributes at the worksite 10. While FIG. 2 shows some example positions of an observation sensor system 150, it will be understood that observation sensor systems 150 can, alternatively or additionally, be positioned (or otherwise disposed) at a variety of other locations on harvester 100-1. As shown, an observation sensor system 150 (illustratively 150-1) can be mounted or otherwise coupled to the harvester 100-1 to detect attributes at the header 104 or ahead of the header 104. As shown, an observation sensor system 150 (illustratively 150-2) can be positioned at various other locations on the harvester 100-1 to detect around the harvester, such as in adjacent areas of the field (e.g., adjacent passes). In addition to various other attributes, observation sensor systems 150 can be used to detect various harvest readiness attributes, for use in control of the harvester 100-1 or for use in machine learning (as will be described in more detail herein).

A harvester 100 can include various other sensors, some of which will be described in FIG. 5. For example, as will be described in FIG. 5, a harvester 100 can include one or more moisture sensors that detect a moisture of crop plant material.

As further illustrated in FIG. 2, a harvester 100 can include a docking station 160 configured to dock a drone (illustratively drone 200-1) and, optionally, a tether 162 coupling the harvester 100 and the drone 200. The tether 162 can include communication circuitry that provides for communication between harvester 100 and drone 200 and power circuitry that provides for power to the drone 200. Tether 162 can be any of a variety of lengths. In some examples, a tether 162 is not included and, instead, the docking station 160 includes power circuitry that provides power to the drone 200. While FIG. 2 shows a docking station docking a drone 200-1, it will be understood that in other examples, a harvester 100 can include a docking station configured to dock another type of drone 200, such as a UGV 200-2, which can be tethered to or untethered from harvester 100.

A harvester 100 can include various other items, some of which will be described in FIG. 3.

Figure 3:
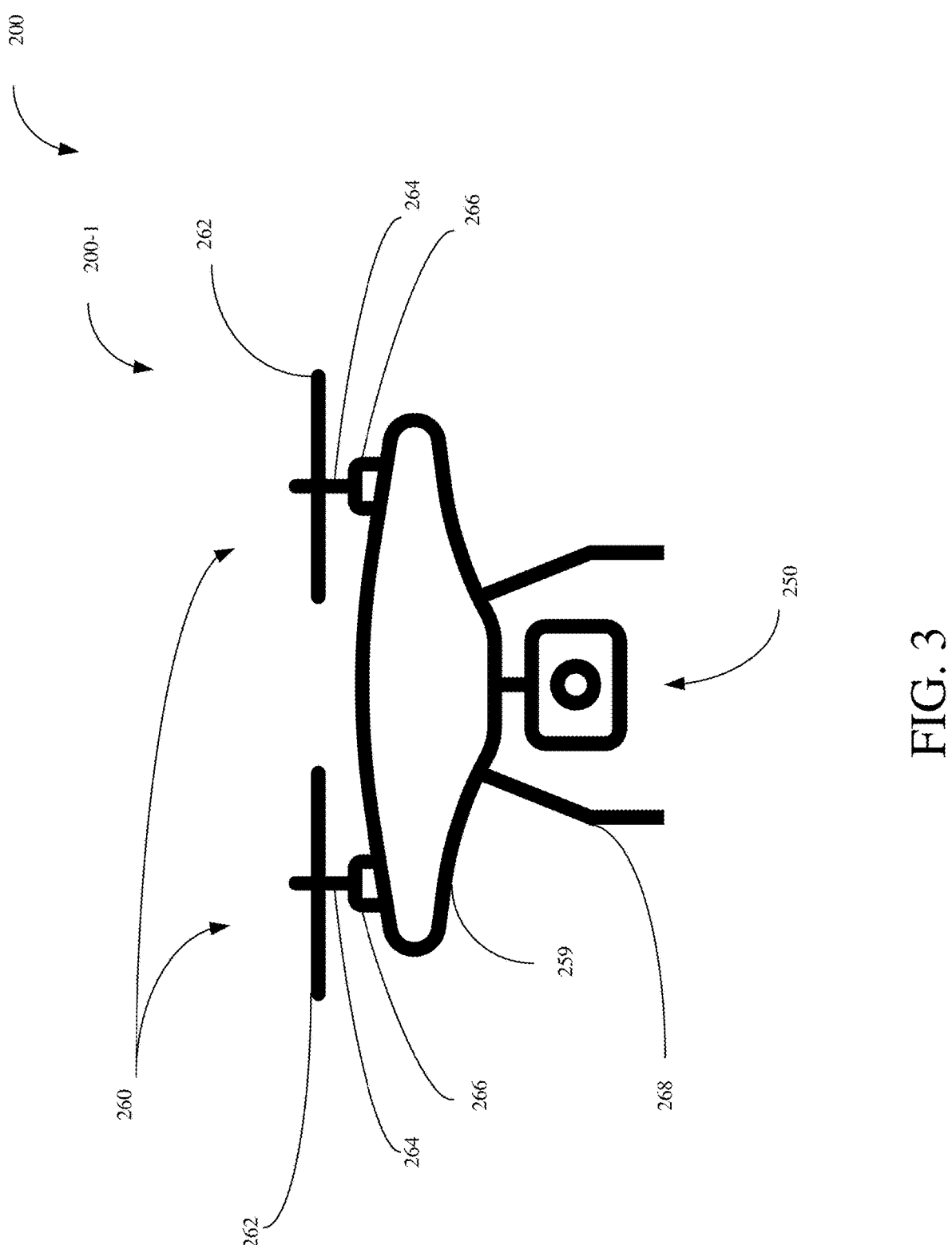
FIG. 3 is a pictorial illustration showing an example unmanned aerial vehicle (UAV).

FIG. 3 is a pictorial illustration showing one example drone 200, in the form of a UAV 200-1. As illustrated in FIG. 3, UAV 200-1 includes harvest readiness sensor system 250, body 259, propeller systems 260, and landing gear 268. Each propeller system 260 includes a plurality of propeller blades 262, a rotor 264, and a motor 266. In the illustrated example, UAV 200-1 is a quadcopter (i.e., in the illustrated example, drone 200-1 includes four propeller systems 260). Though, in other examples, UAV 200-1 could include a different number of propeller systems 260. It will be understood by those skilled in the art, that the each of the motors 266 can be individually controlled, and that the speed and, in some examples, the direction of rotation of the motors 266 is adjustable to controllably move and position the UAV 200-1. Harvest readiness sensor system 250 can include one or more sensors that detect harvest readiness attributes at a worksite. Harvest readiness sensor system 250 can include one or more of a variety of sensors, such as cameras (e.g., mono cameras, stereo cameras, color (e.g. RGB) cameras, multispectral cameras, thermal cameras, infrared cameras, near-infrared cameras, etc.), lidar sensors, radar sensors, terahertz sensors, as well as various other sensors configured to emit and/or receive electromagnetic radiation, ultrasonic sensors, as well as a variety of other sensors. UAV 200-1 can include various other sensors, some of which will be described in FIG. 5.

UAV 200-1 can include various other items, some of which will be described in FIG. 5. For example, but not by limitation, as will be described in FIG. 5, UAV 200-1 can include a crop plant engaging component.

Figure 4:
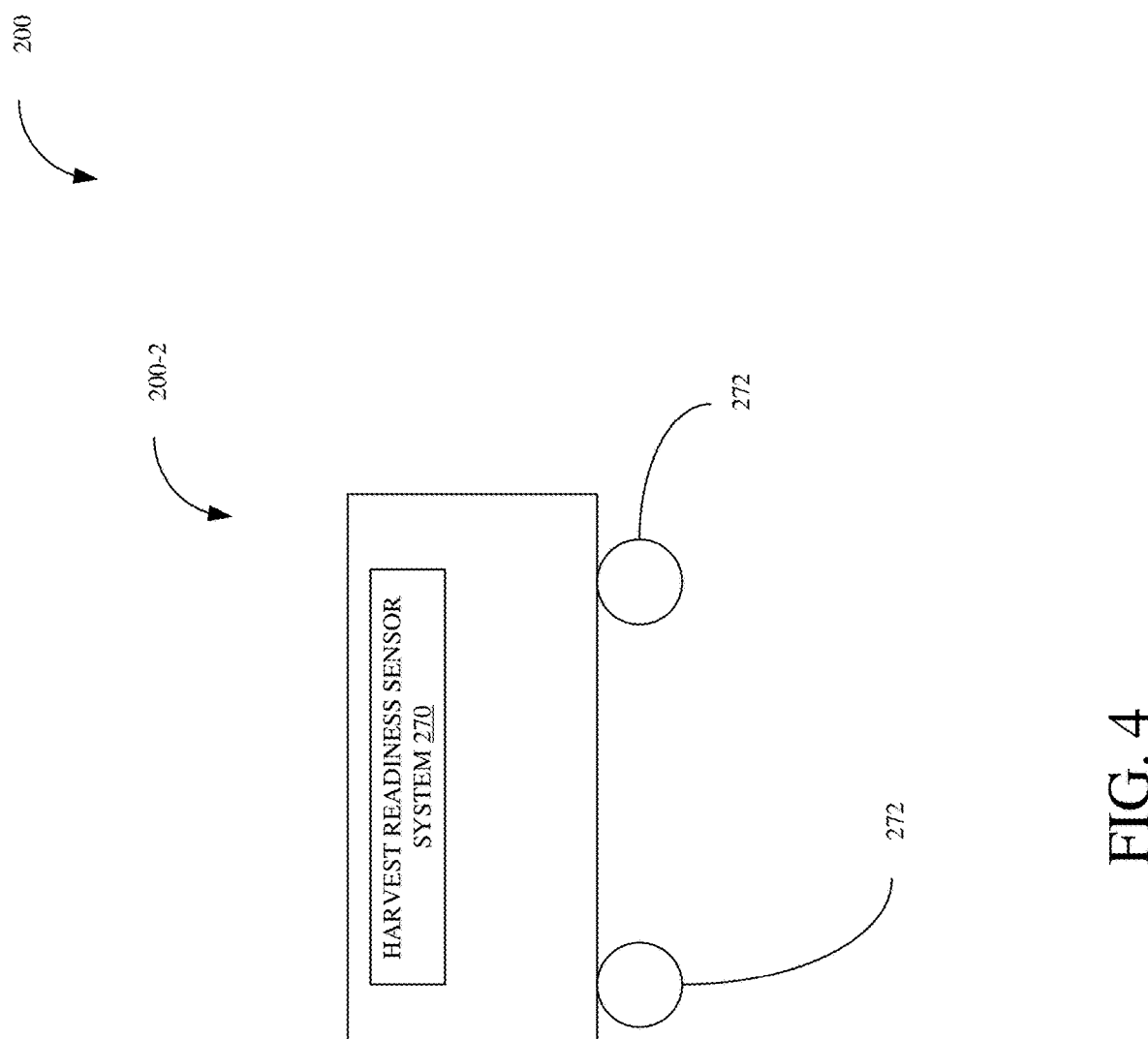
FIG. 4 is a partial pictorial illustration, partial block diagram showing an example unmanned ground vehicle (UGV).

FIG. 4 is a partial pictorial illustration, partial block diagram showing one example drone 200 in the form of a UGV 200-2. As illustrated in FIG. 4, UGV 200-2 includes harvest readiness sensor system 270, crop contacting member 271, and ground engaging traction elements 272. The ground engaging traction elements (illustratively wheels, though in other examples could be tracks) support the UGV over the surface over the worksite and are controllably moveable to propel and steer the UGV 200-2, such as by a travel subsystem (described in FIG. 5) which can include one or more actuators (e.g., motors, etc.) for driving the elements 272 and one or more actuators (e.g., cylinders, linear actuators, etc.) for turning the elements 272. Harvest readiness sensor system 270 can include one or more sensors that detect harvest readiness attributes at a worksite. Harvest readiness sensor system 270 can include one or more of a variety of sensors, such as cameras (e.g., mono cameras, stereo cameras, color (e.g. RGB) cameras, multispectral cameras, thermal cameras, infrared cameras, near-infrared cameras, etc.), lidar sensors, radar sensors, terahertz sensors, as well as various other sensors configured to emit and/or receive electromagnetic radiation, ultrasonic sensors, as well as a variety of other sensors. UGV 200-2 can include various other sensors, some of which will be described in FIG. 5.

UGV 200-2 can include various other items, some of which will be described in FIG. 5. For example, but not by limitation, as will be described in FIG. 5, UGV 200-2 can include a crop plant engaging component.

UGV 200-2 can include various other items, some of which will be described in FIG. 5.

Figure 5A:
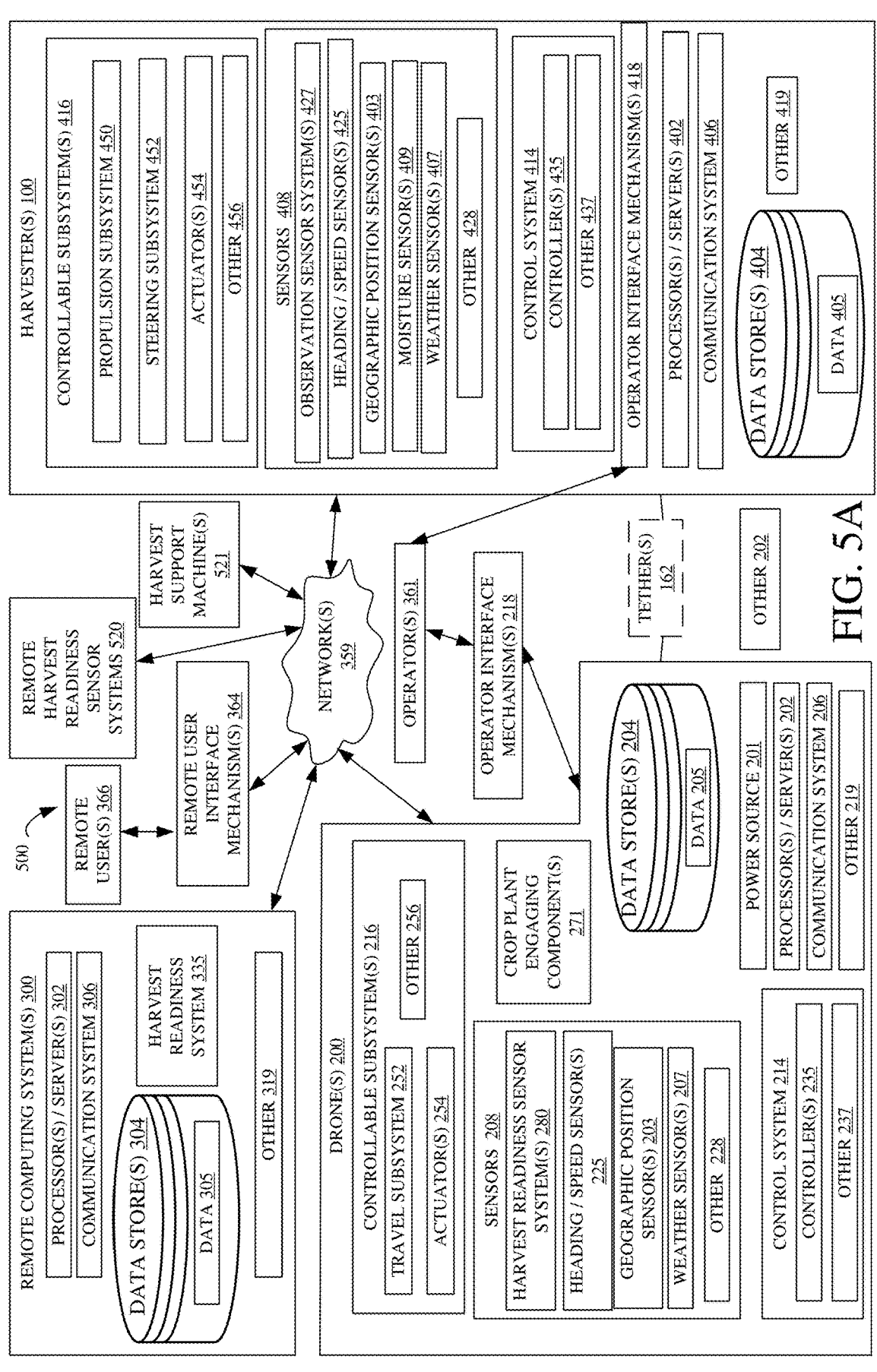

FIGS. 5A and 5B (collectively referred to herein as FIG. 5) show a block diagram showing one example agricultural harvesting system architecture 500 (hereinafter also referred to as harvesting system 500 or as system 500). Agricultural system 500 includes one or more agricultural harvesters 100 and one or more drones 200 (e.g., one or more UAVs 200-1 or one or more UGVs 200-2, or both). System 500 also includes one or more remote computing systems 300, one or more networks 359, one or more remote user interface mechanisms 364, one or more remote harvest readiness sensor systems 520, one or more harvest support machines 521, and can include a variety of other items 202 as well. As illustrated, system 500 can, optionally, include one or more tethers 162, each tether 162 tethering a harvester 100 to a drone 200.

Each harvester 100, itself, illustratively includes one or more processors or servers 402, one or more data stores 404, communication system 406, one or more sensors 408, control system 414, one or more controllable subsystems 416, one or more operator interface mechanisms 418, and can include various other items and functionality 419 as well.

Each drone 200, itself, illustratively includes one or more processors or servers 202, one or more data stores 204, communication system 206, one or more sensors 208, control system 214, one or more controllable subsystems 216, one or more operator interface mechanisms 218, one or more crop engaging components 271, and can include various other items and functionality 219 as well.

Remote computing systems 300, as illustrated, include one or more processors or servers 302, one or more data stores 304, communication system 306, harvest readiness system 315, and can include various other items and functionality 319.

Each harvest support machines 521, itself, illustratively includes one or more processors or servers 602, one or more data stores 604, communication system 606, one or more sensors 608, control system 614, one or more controllable subsystems 616, one or more operator interface mechanisms 618, and can include various other items and functionality 619 as well. Harvest support machines 521 can include other types of agricultural work machines used during a harvesting operation. Harvest support machines 521 can include, for example, material receiving machines (e.g., mobile commodity trailers, mobile commodity carts, etc.). A material receiving machine can include a towing vehicle (e.g., tractor, truck, etc.) and a towed commodity receptacle (e.g., cart, trailer, etc.).

Data stores 204, data stores 304, data stores 404, and data stores 604 each store a variety of data (generally indicated as data 205, data 305, data 405, and data 605 respectively), some of which will be described in more detail herein. For example, data 205, data 305, data 405, or data 605, or a combination thereof, can include, among other things, worksite data, historical data, sensor data (e.g., harvest readiness sensor data, other sensor data), machine data, threshold data, as well as various other data. Some examples of the various data will be described in more detail in FIG. 6. Additionally, data 205 can include computer executable instructions that are executable by one or more processors or servers 202 to implement other items or functionalities of system 500, including other items or functionalities of drones 200. Additionally, data 305 can include computer executable instructions that are executable by one or more processors or servers 302 to implement other items or functionalities of system 500, including other items of remote computing systems 300. Additionally, data 405 can include computer executable instructions that are executable by one or more processors or servers 402 to implement other items or functionalities of system 500, including other items or functionalities of harvesters 100. Additionally, data 605 can include computer executable instructions that are executable by one or more processors or servers 602 to implement other items or functionalities of system 500, including other items or functionalities of harvest support machines 521. It will be understood that data stores 204, data stores 304, data stores 404, and data stores 604 can include different forms of data stores, for instance both volatile data stores (e.g., Random Access Memory (RAM)) and non-volatile data stores (e.g., Read Only Memory (ROM), hard drives, solid state drives, etc.).

Sensors 408 can include one or observation sensor systems 427, one or more heading/speed sensors 425, one or more geographic position sensors 403, one or more weather sensors 407, one or more moisture sensors 409, and can include various other sensors 428 as well. The sensor data generated by sensors 408 can be communicated to remote computing systems 300, to drones 200, to other harvesters 100, and to other items of a harvester 100. Control system 414, itself, can include one or more controllers 435 for controlling various other items of harvester 100, and can include other items 437 as well. Controllable subsystems 416 can include propulsion subsystem 450, steering subsystem 452, actuators 454, and can include various other subsystems 456 as well.

Sensors 208 can include one or more harvest readiness sensor systems 280, one or more heading/speed sensors 225, one or more geographic position sensors 203, one or more weather sensors 207, and can include various other sensors 228 as well. The sensor data generated by sensors 208 can be communicated to remote computing systems 300, to harvesters 100, to other drones 200, and to other items of a drone 200. Control system 214, itself, can include one or more controllers 235 for controlling various other items of a drone 200, and can include other items 237 as well. Controllable subsystems 216 can include travel subsystem 252 and can include various other subsystems 256 as well.

Sensors 608 can include one or more heading/speed sensors 625, one or more geographic position sensors 603, and can include various other sensors 628 as well.

Heading/speed sensors 425 detect a heading characteristic (e.g., travel direction) or speed characteristic (e.g., travel speed, acceleration, deceleration, etc.), or both, of an agricultural harvester 100. This can include sensors that sense the movement (e.g., rotation) of ground-engaging elements (e.g., wheels or tracks) or movement of components coupled to the ground engaging elements (e.g., axles) or other elements, or can utilize signals received from other sources, such as geographic position sensors 403. Thus, while heading/speed sensors 425 as described herein are shown as separate from geographic position sensors 403, in some examples, machine heading/speed is derived from signals received from geographic position sensors 403 and subsequent processing. In other examples, heading/speed sensors 425 are separate sensors and do not utilize signals received from other sources.

Heading/speed sensors 225 detect a heading characteristic (e.g., travel direction) or speed characteristic (e.g., travel speed, acceleration, deceleration, etc.), or both, of a drone 200. In the case of UAVs 200-1, this can include sensors that sense movement (e.g., rotation) of components (e.g., 266, 264, or 262) of the UAV 200-1, sensors that sense movement of the UAV 200-1 (e.g., accelerometers, etc.), or can utilize signals received from other sources, such as geographic position sensors 203. In the case of UGVs 200-2, this can include sensors that sense the movement (e.g., rotation) of ground-engaging elements (e.g., wheels or tracks) or movement of components coupled to the ground engaging elements (e.g., axles) or other elements, or can utilize signals received from other sources, such as geographic position sensors 203. Thus, while heading/speed sensors 225 as described herein are shown as separate from geographic position sensors 203, in some examples, machine heading/speed is derived from signals received from geographic position sensors 203 and subsequent processing. In other examples, heading/speed sensors 225 are separate sensors and do not utilize signals received from other sources.

Heading/speed sensors 625 detect a heading characteristic (e.g., travel direction) or speed characteristic (e.g., travel speed, acceleration, deceleration, etc.), or both, of a harvest support machine 521. This can include sensors that sense the movement (e.g., rotation) of ground-engaging elements (e.g., wheels or tracks) or movement of components coupled to the ground engaging elements (e.g., axles) or other elements, or can utilize signals received from other sources, such as geographic position sensors 603. Thus, while heading/speed sensors 625 as described herein are shown as separate from geographic position sensors 603, in some examples, machine heading/speed is derived from signals received from geographic position sensors 603 and subsequent processing. In other examples, heading/speed sensors 625 are separate sensors and do not utilize signals received from other sources.

Geographic position sensors 403 illustratively sense or detect the geographic position or location of a harvester 100. Geographic position sensors 203 illustratively sense or detect the geographic position or location of a drone 200. Geographic position sensors 603 illustratively sense or detect the geographic position or location of a harvest support machine 521. Geographic position sensors 403, 203, and 603 can include, but are not limited to, a global navigation satellite system (GNSS) receiver that receives signals from a GNSS satellite transmitter. Geographic position sensors 403, 203, and 603 can also include a real-time kinematic (RTK) component that is configured to enhance the precision of position data derived from the GNSS signal. Geographic position sensors 403, 203, and 603 can include a dead reckoning system, a cellular triangulation system, or any of a variety of other geographic position sensors.

Weather sensors 207 and 407 illustratively sense or detect various weather attributes relative to the worksite. Weather sensors 207 and 407 can include temperature sensors, humidity sensors, dewpoint sensors, wind sensors (detect wind speed and direction), light sensors (detect characteristics of ambient light, such as the intensity or amount of ambient light, the inclination angle of ambient light, etc.), precipitation sensors (detect precipitation type and amount), odor sensors (detect ambient odors), ambient airborne debris sensors, cloud coverage sensors, as well as various other sensors. It will be noted that, in some examples, at least some weather characteristics can be obtained from sources other than weather sensors, such as from third-party weather sources (e.g., Internet-based sources), via a communication system (e.g., 206, 306, or 406) over networks 359. As discussed above, weather attributes can be worksite readiness attributes and thus, can be harvest readiness attributes. While weather sensors 207 are described herein as separate from harvest readiness sensor systems 280, it will be understood that weather sensor sensors 207 can be included as part of harvest readiness sensor systems 280.

Moisture sensors 409 detect crop plant moisture (e.g., crop moisture or MOG moisture, or both). Moisture sensors 409 can include capacitive sensors, resistive sensors, or other types of moisture sensors. As previously discussed, crop plant moisture can be a crop plant readiness attribute and thus, can be a harvest readiness attribute.

Observation sensor systems 427 detect attributes at the worksite. In one example, observation sensor systems 427 are similar to observation sensor systems 150 or can be other types of observation sensor systems. Observation sensor systems 427 can be used to detect, among other things, one or more harvest readiness attributes.

Thus, it will be understood that a harvester can include a harvest readiness sensor system that includes one or more of observation sensor systems 427, moisture sensors 409, or weather sensors 407.

Harvest readiness sensor systems 280 detect harvest readiness at the worksite. In one example, harvest readiness sensor systems 280 are similar to harvest readiness sensor systems 250 or harvest readiness sensor systems 270 or can be other types of harvest readiness sensor systems. As previously described, observation sensor systems 427 and moisture sensors 409 on harvester 100 can also be used to detect one or more harvest readiness attributes.

Sensors 408 can also include various other types of sensors 428. Sensors 208 can also include various other types of sensors 228. Sensors 608 can include various other types of sensors 628.

Remote harvest readiness sensor systems 520 can be located at various locations, remote from the other items of system 500 and, in some examples, remote from the worksite. For example, remote harvest readiness sensor systems 520 can be located in a building in the farm site remote from the worksite, in a lab, or at another location. Remote harvest readiness sensor systems detect harvest readiness of samples, such as crop readiness of crop material samples. Remote harvest readiness sensors 520 can include one or more of a variety of sensors, such as cameras (e.g., mono cameras, stereo cameras, color (e.g. RGB) cameras, multi-spectral cameras, thermal camera, infrared cameras, near-infrared cameras, etc.), lidar sensors, radar sensors, terahertz sensors as well as various other sensor configured to emit and/or receive electromagnetic radiation, ultrasonic sensors, capacitive moisture sensors, weight sensors, as well as a variety of other sensors.

Control system 414 can include one or more controllers 435 (e.g., electronic control units, which can include or be implemented by one or more processors, such as one or more processors 402) that generate control signals to control one or more components of a harvester 100 or components of system 500, or both. For example, but not by limitation, controllers 435 can include, a communication system controller to control communication system 406, an interface controller to control one or more interface mechanisms (e.g., 418 or 364, or both), a propulsion controller to control propulsion subsystem 450 to control a travel speed of a harvester 100, a path planning controller to control steering subsystem 452 to control a route or heading of a harvester 100, and one or more actuator controllers to control operation of actuators 454 of a harvester 100. In other examples, a central controller 435 can be used to generate control signals to control a plurality of the controllable subsystems 416 as well, in some examples, other items of system 500.

Control system 214 can include a variety of controllers 235 (e.g., electronic control units, which can include or be implemented by one or more processors, such as one or more processors 202) that generate control signals to control one or more components of a drone 200 or components of system 500, or both. For example, but not by limitation, controllers 235 can include a communication system controller to control communication system 206, an interface controller to control one or more interface mechanisms (e.g., 218 or 364, or both), an actuator controller for controlling one or more actuators 254 (e.g., crop engaging component actuators), and a travel controller to control travel subsystem 252 to control a travel speed, travel direction, and location of a drone 200. In other examples, a central controller 235 can be used to generate control signals to control a plurality of the controllable subsystems 216 as well, in some examples, other items of system 500.

Control system 614 can include one or more controllers 635 (e.g., electronic control units, which can include or be implemented by one or more processors, such as one or more processors 602) that generate control signals to control one or more components of a harvest support machine 521 or components of system 500, or both. For example, but not by limitation, controllers 635 can include, a communication system controller to control communication system 606, an interface controller to control one or more interface mechanisms (e.g., 618 or 364, or both), a propulsion controller to control propulsion subsystem 650 to control a travel speed of a harvest support machine 521, a path planning controller to control steering subsystem 652 to control a route or heading of a harvest support machine 521, and one or more actuator controllers to control operation of actuators 654 of a harvest support machine 521. In other examples, a central controller 635 can be used to generate control signals to control a plurality of the controllable subsystems 616 as well, in some examples, other items of system 500.

Propulsion subsystem 450 includes one or more controllable actuators (e.g., internal combustion engine, motors, pumps, gear boxes, etc.) that drive the ground engaging traction elements (e.g., wheels or tracks) of a harvester 100.

Steering subsystem 452 includes one or more controllable actuators (e.g., electric actuators, hydraulic actuators, etc.) that are controllably actuatable to control the steering and thus heading of a harvester 100.

Travel subsystem 252 includes one or more controllable actuators operable to drive movement of drones 200 to control travel speed, travel direction, and positioning of the drones 200. In the example of UAVs 200-1, travel subsystem 252 includes one or more controllable actuators (e.g., motors 266) that drive movement of the propeller systems 260 to move and position a UAV 200-1. It will be understood that the speed or direction of rotation, or both, of the motors 266, and thus the propeller systems, can be controlled. Additionally, each motor 266 can be individually controlled, though, in some examples, sub-sets of the motors 266 (e.g., pairs, etc.) are controlled similarly. It will be understood that travel subsystem 252 is controllable to control the travel speed, travel direction, and position of a UAV 200-1. In the example of UGVs 200-2, travel subsystem 252 includes one or more controllable actuators (e.g., motors, etc.) that drive the ground engaging traction elements 272 of a UGV 200-2 and further includes one or more controllable actuators (e.g., electric actuator, hydraulic actuators, etc.) that are controllably actuatable to control the steering and thus heading of a UGV 200-2. It will be understood that travel subsystem 252 is controllable to control the travel speed, travel direction, and position of a UGV 200-2.

Actuators 454 include a variety of different types of actuators that control operating parameters of one or more components of a harvester 100. Actuators 454 can include actuators that control the position or orientation of components of a harvester 100 as well as actuators that control a speed of components of a harvester 100. Actuators 454 can include, without limitation, motors, valves, pumps, hydraulic actuators (e.g., hydraulic cylinders, etc.), pneumatic actuators (e.g., pneumatic cylinders, etc.), electric actuators (e.g., linear actuators, etc.), as well as various other types of actuators.

In the example of combine harvester 100-1, actuators 454 can include actuators controllable to control operating parameters of one or more of the components described in FIG. 2. For example, actuators 454, in the example of combine harvester 100-1, can include actuators for controlling the orientation (height, pitch, roll) of header 104 and actuators for controlling speed or position of components of header 104. Additionally, in the example of combine harvester 100-1, actuators 454 can include actuators for controlling speed or position of components of material handling subsystem 125, cleaning subsystem 118, material transfer subsystem, residue subsystem 138, as well as various other actuators.

Actuators 654 can include a variety of different types of actuators that control operating parameters of one or more components of a harvest support machine 521. Actuators 654 can include actuators that control the position or orientation of components of a harvest support machine 521 as well as actuators that control a speed of components of a harvest support machine 521. Actuators 654 can include, without limitation, motors, valves, pumps, hydraulic actuators (e.g., hydraulic cylinders, etc.), pneumatic actuators (e.g., pneumatic cylinders, etc.), electric actuators (e.g., linear actuators, etc.), as well as various other types of actuators.

Crop plant engaging components 271 are configured to exert force on crop plants at the worksite such as by being brought into contact (by controllably moving a drone 200 or by controllably extending and retracting the crop plant engaging component) with a crop plant or by exerting a force on a crop plant in another way (e.g., blown air stream against the crop plant, vacuum suction, etc.). Crop plant engaging components 271 can be an elongated member (e.g., gripper tool, vacuum tool, bumper, club, stick, pole, etc.) configured to be brought into physical contact with a crop plant. A crop plant engaging component 271 can be controllably extendible and retractable (e.g., telescoping). Crop plant engaging components 271 can be an air stream generator (e.g., fan, blower, motor, propeller (e.g., 262), etc.) controllably actuatable to generate an air stream and direct the air stream towards and against crop plants. Crop plant engaging components 271 can be removal tools (e.g., gripper tool, vacuum tool, etc.) that remove crop plant material (e.g., ear, head, pod, commodity (e.g., grain), leaf, stalk material, etc.) from the crop plant. Thus, in some examples, the crop plant engaging components 271 can be separate components, or, in some examples other components (e.g., propellers (e.g., 262) of the drone 200 can also function as crop engaging components (e.g., air stream generators). Actuators 254 can include one or more actuators (e.g., fan, blower, motors, propellers, etc.) for controllably generating an air stream or for generating a vacuum suction. Actuators 254 can include one or more actuators (e.g., motors, linear actuators, etc.) for controlling (e.g., extending and retracting) one or more crop engaging components 271. In the example of a crop plant engaging component 271 in the form of a removal tool (e.g., gripper tool, vacuum tool, etc.) the removal tool can be controllably actuated to remove crop plant material (e.g., ear, pod, head, commodity (e.g., grain), leaf, stalk material, etc.) from a crop plant. Actuators 254 can include one or more actuators (e.g., motors, linear actuators, etc.) for controlling (e.g., extending and retracting and closing and opening) crop plant engaging components 271 in the form of gripper tools. The obtained crop plant material can be provided to a remote harvest readiness sensor system 520.

It will be understood that sensors 208, such as one or more sensors of harvest readiness sensor systems 280, can be used to detect the crop plants to identify the location of the crop plants or of particular components of the crop plants such that the drone 200, and the crop plant engaging components 271, can be controlled to exert force on the crop plants (or components thereof).

Communication system 406 is used to communicate between components of a harvester 100 or with other items of system 500, such as remote computing systems 300, drones 200, harvest support machines 521, other harvesters 100, or user interface mechanisms 364, or a combination thereof. Communication system 206 is used to communicate between components of a drone 200 or with other items of system 500, such as remote computing systems 300, harvesters 100, harvest support machines 521, other drones 200, or user interface mechanisms 364, or a combination thereof. Communication system 306 is used to communicate between components of a remote computing system 300 or with other items of system 500, such as harvesters 100, drones 200, harvest support machines 521, other remote computing systems 300, or user interface mechanisms 364, or a combination thereof. Communication system 606 is used to communicate between components of a harvest support machine 521 or with other items of system 500, such as harvesters 100, drones 200, remote computing systems 300, other harvest support machines 521, or user interface mechanisms 364, or a combination thereof.

Communication systems 206, 306, 406, and 606 can each include one or more of wired communication circuitry or wireless communication circuitry, as well as wired or wireless communication components. In some examples, communication systems 206, 306, 406 and 606 can each be a cellular communication system, a system for communicating over a wide area network or a local area network, a system for communicating over a controller area network (CAN), such as a CAN bus, a system for communication over a near field communication network, or a communication system configured to communicate over any of a variety of other networks. Communication systems 206, 306, 406 and 606 can each also include a system that facilitates downloads or transfers of information to and from a secure digital (SD) card or a universal serial bus (USB) card, or both. Communication systems 206, 306, 406, and 606 can each utilize network 359. Networks 359 can be any of a wide variety of different types of networks such as the Internet, a cellular network, a wide area network (WAN), a local area network (LAN), a controller area network (CAN), a near-field communication network, or any of a wide variety of other networks or communication systems.

FIG. 5 also shows that remote computing systems 300 can include harvest readiness system 235. Harvest readiness system 315 plans, controls, and processes the harvest readiness monitoring performed by drones 200 at the worksite to determine harvest readiness at the worksite. Harvest readiness system 315 is also operable to output harvest plans (assignment, routes, operating parameters, etc.) for use in controlling one or more harvesters. Harvest readiness system 315 will be discussed in more detail in FIG. 6.

FIG. 5 shows that one or more operators 361 can operate harvesters 100, drones 200, and harvest support machines 521. The operators 361 interact with operator interface mechanisms 418, operator interface mechanisms 218, or operator interface mechanism 618. In some examples, operator interface mechanisms 418, operator interface mechanisms 218, and operator interface mechanisms 618 can each include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the operators 361 can interact with operator interface mechanisms 418, operator interface mechanisms 218, and operator interface mechanisms 618 using touch gestures. Additionally, at least some of the operator interface mechanisms 418, operator interface mechanisms 218, and operator interface mechanisms 618 can be used to present (e.g., display, audible presentation, haptic presentation, etc.) various information. The examples described above are provided as illustrative examples and are not intended to limit the scope of the present disclosure. Consequently, other types of operator interface mechanisms 418 operator interface mechanisms 218, and operator interface mechanisms 618 can be used and are within the scope of the present disclosure.

Additionally, as shown in FIG. 5, operator interface mechanisms 218 can be separate from, but communicatively coupled to, drones 200. In some examples, operator interface mechanisms 218 are a part of or included as functionality of operator interface mechanisms 418.

FIG. 5 also shows remote users 366 interacting with harvesters 100, drones 200, harvest support machines 521, and remote computing systems 300 through user interface mechanisms 364 over networks 359. In some examples, user interface mechanisms 364 can include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the users 366 can interact with user interface mechanisms 364 using touch gestures. Additionally, at least some of the user interface mechanisms 364 can be used to present (e.g., display, audible presentation, haptic presentation, etc.) various information. The examples described above are provided as illustrative examples and are not intended to limit the scope of the present disclosure. Consequently, other types of user interface mechanisms 364 can be used and are within the scope of the present disclosure.

Remote computing systems 300 can be a wide variety of different types of systems, or combinations thereof. For example, remote computing systems 300 can be in a remote server environment. Further, remote computing systems 300 can be remote computing systems, such as mobile devices, a remote network, a farm manager system, a vendor system, or a wide variety of other remote systems. In one example, harvesters 100 can be controlled remotely by remote computing systems 300 or by remote users 366, or both. In one example, UAVs 200 can be controlled remotely by remote computing systems 300 or by remote users 366, or both. In one example, harvest support machines 521 can be controlled remotely by remote computing systems or by remote users 366, or both. In some examples, operators 361 are on-board (e.g., in an operator compartment, such as a cab) the machines (e.g., 100 or 521). In some examples, operators

361 are remote from the machines (e.g., 100, 200, 521) and control the machines through one or more interface mechanisms (e.g. one or more of 418, one or more of 218, and one or more of 618) which are remote from the machines but operatively coupled (e.g., communicatively coupled, such as over networks 359) to the machines.

It will be understood that, in some examples, items in system 500 can be distributed in various ways, including ways that differ from the example shown in FIG. 5. For example, but not by limitation, harvest readiness system 315, shown in FIG. 5 as being disposed on remote computing systems 330, can be located elsewhere, such as at one or more harvesters 100, one or more harvest support machines 521, or one or more drones 200 In yet other examples, harvest readiness system 315 can be distributed across one or more of a drone 200, a harvester 100, a harvest support machine 521, and a remote computing system 300. Thus, it will be understood that harvest readiness system 315 can be distributed across system 500 in various ways.

FIG. 6 is a block diagram that shows examples of some of the components of system 500 in more detail and information flow between the components.

As illustrated in FIG. 6, it can be seen that data stores 204, data stores 304, data stores 404, data stores 604, or a combination thereof, can include as data (205, 305, 405, and 605 respectively), worksite data 501, historical data 502, sensor data 503, machine data 505, monitoring preferences data 506, threshold data 507, and can include various other data 510, including, but not limited to, other data described elsewhere herein. In some examples, where the data is located can depend on where harvest readiness system 315 (also called system 315) is located.

As shown in FIG. 6, harvest readiness system 315, includes one or more data processing systems 330, monitoring plan identification system 332, crop plant identification system 333, harvest readiness identification system 334, drone operation plan system 336, harvest operation plan system 338, and various other items and functionality 359. Harvest readiness identification system 334, itself, can include harvest readiness model 340, harvest readiness logic 342, learning system 344, and various other items 346. Harvest readiness model 340 can include crop plant readiness model 350 and worksite readiness model 352. As will be described in more detail, system 235 is operable to generate one or more monitoring outputs 360.

Worksite data 501 can include data relative to the worksite (e.g., one or more fields) to be harvested. Worksite data 501 can be in the form of overhead imagery or maps, or both, including or indicating values of one or more attributes of the worksite, such as, but not limited to, vegetation index values (e.g., Normalized Difference Vegetation Index (NDVI) values, etc.), topographic attribute value (e.g., elevation values, slope values, etc.), yield values, soil attribute values (e.g., soil moisture, soil type, etc.), field feature/obstacle values (e.g., values indicative of the presence, location, and type of field features or obstacles), field boundary values (e.g., values indicative of the location of field boundaries as well as field entrances/exits), as well as various other attributes.

Historical data 502 can include data indicative of historical attributes of the worksite, which can be detected during one or more previous operations at the worksite or in other ways. For example, historical data 502 can include historical operation data that indicates parameters and other characteristics relative to previous operations at the worksite, such as historical yield values and historical crop moisture values from previous harvesting operations, historical material application values (e.g., type, location, and amount of material (e.g., fertilizer, herbicide, pesticide, water, etc.), dates and times of material application) applied to the worksite, historical planting values (e.g., type (e.g., species, hybrid, genotype, etc.) of crop planted, dates and times of planting, plant locations, plant spacing, row spacing, etc.), historical tillage values (e.g., whether tillage was performed, where tillage was performed, when tillage was performed, depth of tillage, etc.), historical operating parameters (e.g., travel speed, power consumption, threshing rotor torque, etc.) of the machines performing the historical operations, historical field features/obstacles, as well as various other historical attributes. It will be understood, with reference to historical operations, that the term historical means prior to the upcoming or current harvesting operation. The prior (or historical) operations may have been performed either earlier in the same growing season or in previous seasons. Historical data 502 can include data indicative of historical harvest readiness attributes of the worksite detected earlier in the same growing season or in past seasons.

Sensor data 503 includes sensor data (e.g., images, sensor signals, etc.) generated by sensors 208 and sensors 408.

Machine data 505 includes data indicative of the identity of each of the one or more harvesters 100, data indicative of the type (e.g., model, configuration, etc.) of each of the one or more harvesters 100, as well various other machine data. Machine data 505 includes data indicative of the identity of each of the one or more drones 200 as well as data indicative of the type (e.g., model, configuration, etc.) of each of the one or more drones. The drone type data can indicate, for example, what type of monitoring the drone 200 is capable of performing (e.g., the, if any, harvest readiness sensors on-board, whether the drone includes a crop engaging component and, if so, the type(s), etc.). Machine data 505 includes data indicative of the identity of each of the one or more harvest support machines 521, data indicative of the type (e.g., model, configuration, etc.) of each of the one or more harvest support machines 521, as well various other machine data Monitoring preferences data 506 includes data indicative of pre-set or pre-selected monitoring rules or monitoring preferences for harvest readiness monitoring. Monitoring preferences data 506 can include a pre-set or pre-selected identification of the harvest readiness attributes to be monitored. In some examples, the pre-set or pre-selected identification of the harvest readiness attributes to be monitored can be instructions and can correspond to the input requirements of harvest readiness identification system 334. Monitoring preferences data 506 can include a pre-set or pre-selected number of sampling locations to be monitored for harvest readiness. Monitoring preferences data 506 can include pre-set or pre-selected sampling rules or preferences, such as preferences indicating that specific types of sampling are to be performed (e.g., use sensors on drone, exert force on plant, grab and separate crop plant material sample for detection by harvest readiness sensor systems on-board the drone, grab and separate crop plant material sample and deliver to delivery location for detection by harvest readiness sensor systems off-board the drone, etc.). Monitoring preferences data 506 can include various other pre-set or pre-selected monitoring rules or monitoring preferences. Monitoring preferences data 506 can be derived from various sources such as operator or user inputs, expert knowledge, manufacturer provided information, learning functionality, as well as various other sources.

Threshold data 507 includes data indicative of harvest readiness thresholds, such as thresholds for each of a plurality of harvest readiness attributes (e.g., crop readiness attributes, worksite readiness attributes). Threshold data 507 includes data indicative of thresholds for various other attributes, such as attributes indicated by worksite data 501, attributes indicated by historical data 502, or other attributes indicated by sensor data 503. Threshold data 507 can be derived from various sources such as operator or user inputs, expert knowledge, manufacturer provided information, learning functionality, as well as various other sources. In one example, thresholds 507 can be based on other data 510. For instance, other data 510 can include data indicative of a commodity (e.g., grain) drier capacity and a harvest readiness threshold, such as a moisture threshold, can be based on the commodity drier capacity. For instance, where the drier capacity is limited (or if the drier is full), the moisture threshold may be relatively lower, whereas, if the drier has more capacity (or is empty), the moisture threshold may be relatively higher. Thus, in such an example, whether crop of a given moisture is ready for harvesting can depend on capacity of a commodity drier.

Data processing systems process worksite data 501, historical data 502, sensor data 503, machine data 505, threshold data 507, and other data 510 to generate processed data. The processed data can include computer readable values, useable (or readable) by other items of harvest readiness system 315. Data processing system can include various processing functionality, including image processing functionality, sensor signal processing functionality, filtering functionality, categorization functionality, normalization functionality, aggregation functionality, color extraction functionality, analog-to-digital conversion functionality, other conversion functionality (e.g., look up tables, equations, mathematical functions, models, etc.), as well as various other data processing functionalities. It will be understood then that data processing systems 330 can, for example, convert analog signals to readable digital signals (or digital values). It will be understood that data processing systems 330 can, for example, process captured images to extract values (e.g., pixel values, etc.), and can further convert the extracted values. It will be understood that data processing systems 330 can perform pre-processing and post-processing. It will be understood that data processing systems 330 can perform various forms of aggregation on the extracted or converted values.

Monitoring plan identification system 332 is operable to identify one or more locations at the worksite to be sampled (e.g., detected by sensors on-board the drone 200 or plant material retrieved, or both). Generally, it can be impractical to sample every location at the worksite. Thus, harvest readiness system 315 is operable to command drones 200 to conduct select sampling (sampling of a select number of locations) at the worksite to determine harvest readiness of the worksite. Monitoring plan identification system 332 is operable to identify the one or more locations to be sampled based on worksite data 501 and historical data 502.

For example, monitoring plan identification system 332 can identify one or more locations to be sampled based on vegetation index values (e.g., NDVI values), as part of worksite data 501. For instance, monitoring plan identification system 332 can identify, as the locations to sample, locations with higher vegetation index values or with vegetation index values at or above a threshold. For instance, crops having higher vegetation index values at a given time can take longer to be ready, and thus can be useful in selecting sampling locations for determination of crop readiness. Additionally, higher vegetation index values can indicate the presence of moisture on or in the soil and thus, vegetation index values can can be useful in selecting sampling locations for determination of worksite readiness.

In another example, monitoring plan identification system 332 can identify one or more locations to be sampled based on topographic attribute values (e.g., elevation, slope, etc.), as part of worksite data 501. For instance, monitoring plan identification system 332 can identify, as the locations to sample, locations with lower elevation values or locations having lower slope values. For example, water may collect in low spots or flat spots of a worksite. The crop in low spots or flat spots may take longer to be ready as compared to crop in higher spots or steeper spots and the soil may be more moist and have standing water on top of it. Thus, topographic characteristic values can be useful in selecting sampling locations for determination of crop readiness and worksite readiness.

In another example, monitoring plan identification system 332 can identify one or more locations to be sampled based on yield values, as part of worksite data 501. For instance, areas with higher yield values may be indicative of crop that will take longer to be ready or of wetter soil conditions. Additionally, in the interest of maximizing profit, it may be beneficial to sample and thus determine the readiness of crop with higher yield values. Thus, yield values can be useful in selecting sampling locations for determination of crop readiness and worksite readiness.

In another example, monitoring plan identification system 332 can identify one or more locations to be sampled based on soil attribute values (e.g., soil type value, soil moisture values, etc.), as part of worksite data 501. For instance, areas with certain soil types may be indicative of crop that will take longer to be ready or of wetter soil conditions. Additionally, areas with wetter soil (e.g., higher soil moisture values) may be indicative of crop that will take longer to be ready. Thus, soil attribute values can be useful in selecting sampling locations for determination of crop readiness and worksite readiness.

In another example, monitoring plan identification system 332 can identify one or more locations to be sampled based on field feature values (e.g., values indicative of the presence, location, and type of field features). For instance, areas having field feature values indicating the presence of standing water may be indicative of crop that will take longer to be ready or wetter soil conditions or of non-traversability. Thus, field feature values can be useful in selecting sampling locations for determination of crop readiness and worksite readiness.

Additionally, monitoring plan identification system 332 can identify one or more locations to be sampled based on field boundary values, as part of worksite data 501, to ensure that the locations to be sampled are within an area of the worksite having crop. Additionally, it may be that it is desirable to check the worksite readiness of the locations of field entrances/exits. Thus, field boundary values can be useful in selecting sampling locations for determination of crop readiness and worksite readiness.

Monitoring plan identification system 332 can identify one or more locations to be sampled based on various other attributes of worksite data 501 or based on a combination of the above-described attributes of worksite data 501 and various other attributes of worksite data 501.

In another example, monitoring plan identification system 332 can identify one or more locations to be sampled based on historical yield values, of historical data 502. Historical yield values can be useful in selecting sampling locations for determination of crop readiness and worksite readiness for the same reasons that yield values, of worksite data 501, can be useful, as described above.

In another example, monitoring plan identification system 332 can identify one or more locations to be sampled based on historical crop moisture values, of historical data 502. For instance, areas with higher historical crop moisture values may be indicative of crop that will take longer to be ready or of wetter soil conditions. Thus, historical crop moisture values can be useful in selecting sampling locations for determination of harvest readiness.

In another example, monitoring plan identification system 332 can identify one or more locations to be sampled based on historical material application values, of historical data 502. For instance, areas where material (e.g., pesticide, herbicide, fertilizer, water, etc.) has been applied (or where material has been applied more frequently or in more quantity) may be indicative of crop that will take longer to be ready. In an example where the material is water, such areas may be indicative of wetter soil conditions. In another example, the date of the material application operation can be used to identify one or more locations to be sampled. For instance, if a given amount of time has passed since the last pesticide or herbicide application at one or more locations, it may be desirable to sample those one or more locations (i.e., to see if weeds or pests have reemerged). Thus, historical material application values can be useful in selecting sampling locations for determination of harvest readiness.

In another example, monitoring plan identification system 332 can identify one or more locations to be sampled based on historical planting values, of historical data 502. For instance, historical planting values indicative of the type (e.g., species, hybrid, genotype, etc.) of the crop can be used to identify one or more planting locations. For example, there may be multiple types of crop planted at the worksite, and it may be desirable to sample each type. Further, some types may have different maturation periods, and thus, it may be desirable to sample crops of a type that have a longer maturation period. In another example, historical planting values indicative of the time and dates of planting of the crop can be used to identify one or more locations to be sampled. For example, the date at which the crop is planted, relative to an expected maturation period, can be used to identify areas to be monitored. Thus, historical planting values can be useful in selecting sampling locations for determination of harvest readiness.

In another example, monitoring plan identification system 332 can identify one or more locations to be sampled based on historical tillage values, of historical data 502. For instance, areas where tillage was not performed may be indicative of crop that will take longer to be ready. Further, areas where tillage was performed may be indicative of areas that are more susceptible to compaction. Thus, historical tillage values can be useful in selecting sampling locations for determination of harvest readiness.

In another example, monitoring plan identification system 332 can identify one or more locations to be sampled based on historical operating parameter values, of historical data 502. For instance, areas with higher historical power consumption may be indicative of crop that will take longer to be ready or of more difficult to traverse worksite conditions. Further, areas with slower historical travel speed may be indicative of crop that will take longer to be ready or of more difficult to traverse worksite conditions. Further, areas with higher historical threshing rotor torque may be indicative of crop that will take longer to be ready. Thus, historical operating parameter values can be useful in selecting sampling locations for determination of harvest readiness.

In another example, monitoring plan identification system 332 can identify one or more locations to be sampled based on historical field feature values, of historical data 502. Historical field feature values can be useful in selecting sampling locations for determination of crop readiness and worksite readiness for the same reasons that field feature values, of worksite data 501, can be useful, as described above.

In another example, monitoring plan identification system 332 can identify one or more locations to be sampled based on historical harvest readiness values, of historical data 502. For example, it may be that areas of the worksite historically having harvest readiness values that indicate that the worksite or crops were not ready to harvest, may be more likely to have similar values for an upcoming or current operation. Thus, historical harvest readiness values can be useful in selecting sampling locations for determination of harvest readiness.

Monitoring plan identification system 332 can identify one or more locations to be sampled based on various other attributes of historical data 502 or based on a combination of the above-described attributes of historical data 502 and various other attributes of historical data 502.

Monitoring plan identification system 332 can identify one or more locations to be sampled based on a combination of attributes indicated by worksite data 501 and attributes indicated by historical data 502.

Further, monitoring plan identification system 332 can, in identifying the one or more locations to be sampled, compare values of an attribute to a corresponding threshold (as provided by threshold data 507) or can compare the values of an attribute to each other.

Further, monitoring plan identification system 332 can, in identifying the one or more locations to be sampled, utilize monitoring preferences of monitoring preferences data 506.

Monitoring plan identification system 332 is operable to identify one or more harvest readiness attributes to be monitored, such as one or more harvest readiness attributes to be monitored at each monitoring (or sampling) location. Monitoring plan identification system 332 can identify the one or more harvest readiness attributes to be monitored based on monitoring preferences data 506.

Crop plant identification system 333 is operable to identify and locate crop plants (and components thereof) at the worksite, based on sensor data 503. For example, where the harvest readiness monitoring is to include use of a crop plant engaging component 271, crop plant identification system 333 is operable to identify and locate a crop plant (or a component thereof) to be engaged by the crop plant engaging component 271. In this way, a drone 200, and crop plant engaging component 271, can be controlled to exert force on the crop plant (or component thereof), such as by physically contacting the crop plant (or component thereof), directing an air stream at the crop plant (or component thereof), removing material from the crop plant, or in other ways as well. The sensor data 503 can include images, or other sensor data, indicative of the crop plant (or components thereof) generated by one or more sensors of harvest readiness sensor system 280 (or other sensors 228) as well as geographic location data generated by geographic position sensors 203.

Harvest readiness identification system 334 is operable to determine harvest readiness, including both crop plant readiness and worksite readiness, of a worksite to be or currently being harvested based on the harvest readiness sensor data of sensor data 503. A harvest readiness value can be a variety of different values. For example, a harvest readiness value can be an overall harvest readiness value indicating readiness for harvesting. The overall harvest readiness value can be a binary value (e.g., yes or no, 0 or 1, etc.) to indicate whether a sub-area of a field, a field, or multiple fields are ready for harvesting. The overall harvest readiness value can be based on an aggregation of multiple harvest readiness attribute values or based on an aggregation of a crop plant readiness value and a worksite readiness value. A harvest readiness value can be a crop plant readiness value indicative of whether crop plant(s) are ready for harvesting. The crop plant readiness value can be a binary value (e.g., yes or no, 0 or 1, etc.) to indicate whether a crop plant, crop plants of a sub-area of a field, crop plants of a field, or crop plants of multiple fields are ready for harvesting. The crop plant readiness value can be based on an aggregation of multiple crop plant readiness attribute values. A harvest readiness value can be a worksite readiness value indicative of whether a worksite is ready for harvesting. A worksite readiness value can be a binary value (e.g., yes or no, 0 or 1, etc.) to indicate whether a sub-area of a field, a field, or multiple fields are ready for harvesting from a worksite readiness perspective. A worksite readiness value can be based on an aggregation of multiple worksite readiness attribute values.

In determining harvest readiness values, harvest readiness identification system 334 can utilize various models. Models can include, for example, machine learning models, such as functions, including multi-variable functions, such as regressions (e.g., linear regressions, etc.), neural networks, as well as various other models. In one example, harvest readiness identification system 334 utilizes a harvest readiness model 340.

In one example, harvest readiness model 340 can include a crop plant readiness model 350 and a worksite readiness model 352. Crop plant readiness model 350 is configured to receive, as inputs, one or more crop plant readiness attribute values derived from sensor data 503 and generate, as a model output, a crop plant readiness value. Worksite readiness model 352 is configured to receive, as inputs, one or more worksite readiness attribute values derived from sensor data 503 and generate, as a model output, a worksite readiness value. In such an example, the harvest readiness model 340 can generate an overall harvest readiness value based on the crop plant readiness value and the worksite readiness value.

In one example, the harvest readiness model 340 does not include a separate crop plant readiness model and a separate worksite readiness model. Instead, the harvest readiness model 340 is configured to receive, as model inputs, one or more crop plant readiness attribute values or one or more worksite readiness attribute values, or both, and generate, as a model output, an overall harvest readiness value.

In determining harvest readiness values, harvest readiness identification system 334 can utilize harvest readiness logic 342. Harvest readiness logic 342 can utilize thresholds, look-up tables, or rules-based systems to generate harvest readiness values based on harvest readiness attribute values derived from sensor data 503. For example, but not by limitation, to generate a harvest readiness value indicative of being ready for harvest, each of one or more harvest readiness values may need to meet a corresponding threshold value. Harvest readiness logic 342 can generate, for example, crop plant readiness values, worksite readiness values, or overall harvest readiness values.

Learning system 344 is operable to generate learning outputs for adjustment of harvest readiness model 340 or of harvest readiness logic 342 based on attribute values detected during the harvesting operation, such as harvest readiness attribute values detected during the harvesting operation, machine operating parameter values (e.g., power consumption values, travel speed values, threshing rotor speed values, etc.) detected during the harvesting operation, crop loss values detected during the harvesting operation, or yield values detected during the harvesting operation. The attribute values detected during the harvesting operation can be used to calibrate the model, to adjust weights and biases, or for additional model training. The attribute values detected during the harvesting operation can be used to adjust thresholds used by harvest readiness logic 342.

Drone operation plan system 336 is operable to generate drone operation plans for use in controlling one or more drones 200 to monitor the worksite for harvest readiness, based on the monitoring (or sampling) locations identified by monitoring plan identification system 332 and the one or more harvest readiness attributes to be monitored identified by monitoring plan identification system 332. A drone operation plan can include a travel path (e.g., a flight path, route, etc.) for controlling the travel of a drone 200 in performing harvest readiness monitoring. A drone operation plan can include instructions indicating the harvest readiness attributes to be monitored at each monitoring location as well as instructions indicating the parameters for monitoring the identified harvest readiness monitoring attributes (e.g., use sensors on drone, grab and separate crop material, exert force on crop plant, etc.). A drone operation plan can include an assignment, assigning particular drone(s), for conducting particular harvest readiness monitoring. In assigning drones 200, drone operation plan system 336 can utilize machine data 505 indicative of the identity and type data of the drones 200. A drone operation plan can be output, as a harvest readiness output 360, and used in controlling a drone 200.

Harvest operation plan system 338 is operable to generate harvest operation plans for use in controlling one or more harvesters 100 to harvest the worksite or one or more harvest support machines 521, or both, based on the harvest readiness value(s) output by harvest readiness identification system 334, as well as machine data 505 corresponding to the harvesters 100. A harvest operation plan can include one or more of an assignment (assigning a harvester 100 or a harvest support machine 521, or both, to a particular sub-area of a field, a particular field, or a particular set of fields), a travel path (or route), as well as prescribed operating parameters (e.g., settings) of the harvester or the harvest support machine 521, or both, at different locations along the travel path. The harvest operation plan can be output, as a harvest readiness output 360, and used in controlling a harvester 100.

As can be seen, harvest readiness system 315 is operable to generate, based on one or more items of data 205/305/405, one or more harvest readiness outputs 360. Harvest readiness outputs 360 can include one or more monitoring (or sampling) locations, one or more drone operation plans, one or more harvest operation plans, one or more harvest readiness values, one or more other attribute values, as well as various other items or information. The harvest readiness outputs 360 can be provided to a control system 414 for controlling items of a harvester 100, such as one or more controllable subsystems 416 or one or more interface mechanisms 408 (e.g., to generate presentations based on or indicative of the outputs 360), as well as other items of a harvester 100. The harvest readiness outputs 360 can be provided to a control system 214 for controlling items of a drone 200, such as one or more controllable subsystems 216 or one or more interface mechanisms 208 (e.g., to generate presentations based on or indicative of the outputs 360), as well as other items of a drone 200. The harvest readiness outputs 360 can be provided to a control system 614 for controlling items of a harvest support machine 521, such as one or more controllable subsystems 616 or one or more interface mechanisms 608 (e.g., to generate presentations based on or indicative of the outputs 360), as well as other items of a harvest support machine 521. The harvest readiness outputs 360 can be provided to various other items 362 of system 500, such as one or more interface mechanisms 364 (e.g., to generate presentations based on or indicative of the outputs 360).

Figure 7B:
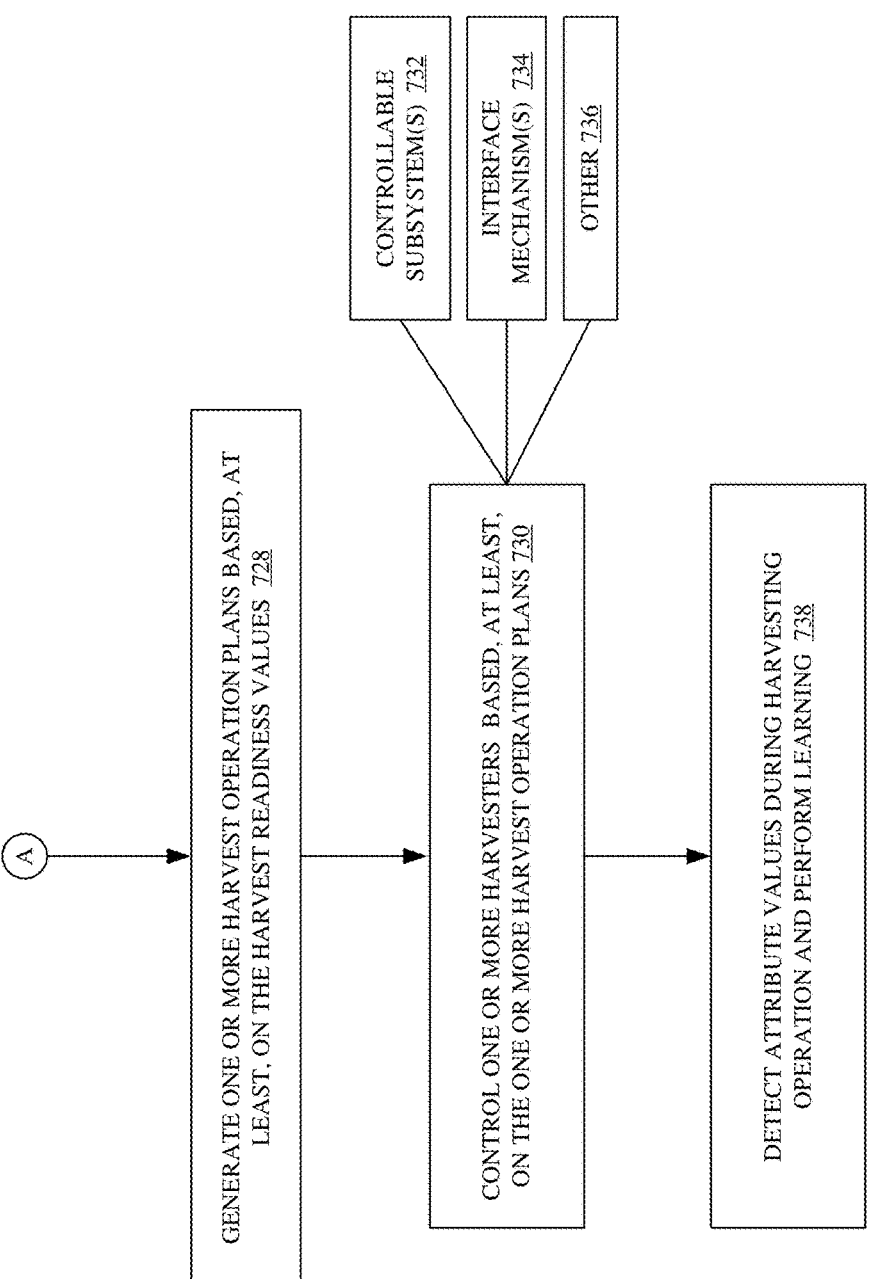

FIGS. 7A and 7B (collectively referred to herein as FIG. 7) show a flow diagram illustrating an example operation 700 of agricultural system 500 in performing harvest readiness monitoring and machine control.

At block 702, harvest readiness system 315 (e.g., monitoring plan identification system 332) identifies one or more monitoring (or sampling) locations to be monitored as well as one or more harvest readiness attributes to be monitored based on or more items of data, such as worksite data 501, as indicated by block 704, historical data 502, as indicated by block 706, monitoring preferences data 506, as indicated by block 708, as well as various other items of data 205/305/405, as indicated by block 710.

At block 712, harvest readiness system 315 (e.g., drone operation plan system 336) generates one or more drone operation plans based, at least, on the identified one or more monitoring locations and the identified one or more harvest readiness attributes to be monitored. As previously discussed, harvest readiness system 315 (e.g. drone operation plan system 336) can also utilize machine data 505 corresponding to the one or more drones 200 in generating the one or more drone operation plans.

At block 714, system 500 (e.g. control systems 214) controls one or more drones 200 based on the one or more drone operation plans to detect harvest readiness and to generate harvest readiness sensor data. As indicated by block 714, controlling the drones 200 can include controlling one or more controllable subsystems 216 of each of the one or more drones 200. As indicated by block 718, controlling the drones 200 can include controlling the drones 200 to detect harvest readiness and generate harvest readiness sensor data utilizing sensors (e.g., 208) on-board the drones 200. As indicated by block 720, controlling the drones 200 can include controlling the drones 200 to exert a force on one or more crop plants, utilizing crop engaging components 271. As indicated by block 722, controlling the drones 200 can include controlling the drones to exert a force (e.g., gripper tool engagement, vacuum suction, etc.) on the crop plant to collect (e.g., remove) a crop plant material sample, utilizing a removal tool (e.g., gripper tool, vacuum tool, etc.) of crop engaging components 271, and to deliver the crop plant material sample to a delivery location (associated with a user or with the harvest readiness sensors off-board the drone 200 (e.g., remote harvest readiness sensor systems 520, sensors 408) or both) such that the crop plant material sample can be detected by harvest readiness sensors off-board the drone 200 such as remote harvest readiness sensor systems 520 or harvest readiness sensors on-board a harvester 100 (e.g., observation sensor systems 427, moisture sensors 409, etc.). Crop plant material sample removal is not limited to delivery to sensors off-board a drone 200, rather, a crop plant material sample can be removed and detected by harvest readiness sensor system 280 on-board the drone 200. The drones 200 can be controlled in various other ways, as indicated by block 724.

At block 726, harvest readiness system 315 (e.g., harvest readiness identification system 334), determines (or generates) one or more harvest readiness values based on the harvest readiness sensor data. As previously discussed, the harvest readiness sensor data can be processed by data processing systems 330 to extract harvest readiness attribute values which can be utilized to determine (or generate) the one or more harvest readiness values.

As shown in FIG. 7, processing proceeds to block 728. At block 728, harvest readiness system 315 (e.g., harvest operation plan system 338) generates one or more harvest operation plans based, at least, on the one or more harvest readiness values. As previously discussed, harvest readiness system 315 (e.g. harvest operation plan system 338) can also utilize machine data 505 corresponding to the one or more harvesters 100 or one or more harvest support machines 521, or both, in generating the one or more harvest operation plans.

At block 730, system 500 (e.g. control systems 414) controls one or more harvesters 100 or one or more harvest support machines 521, or both, based, at least, on the one or more harvest operation plans. As indicated by block 732, controlling the harvesters 100 can include controlling one or more controllable subsystems 416 of each of the one or more harvesters 100. As indicated by block 732, controlling the harvest support machines 521 can include controlling one or more controllable subsystems 616 of each of the one or more harvest support machines 521. As indicated by block 734, controlling the harvesters 100 can include controlling one or more interface mechanisms 408 of each of the one or more harvesters 100 to generate presentations (e.g., displays, etc.) based on or indicative of the harvest operation plans or based on or indicative of other items or information of harvest readiness outputs 360, or both. As indicated by block 734, controlling the harvest support machines 521 can include controlling one or more interface mechanisms 618 of each of the one or more harvest support machines 521 to generate presentations (e.g., displays, etc.) based on or indicative of the harvest operation plans or based on or indicative of other items or information of harvest readiness outputs 360, or both. The harvesters 100 or harvest support machines 521, or both, can be controlled in various other ways, as indicated by block 736.

At block 738, attribute values are detected during harvesting and harvest readiness system 315 (e.g., learning system 344) generates learning outputs based on the attribute values detected during harvesting.

Figure 8:
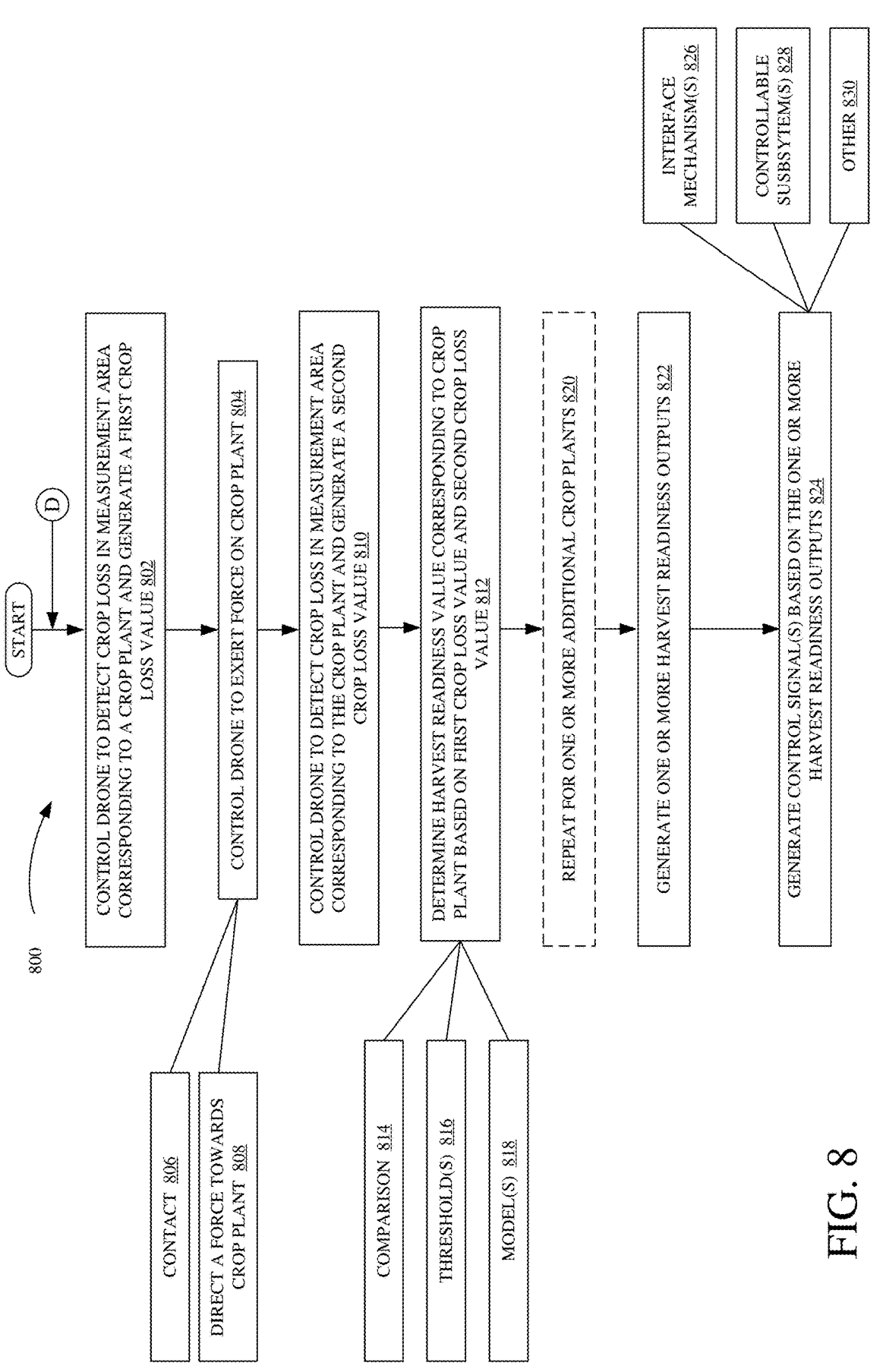
FIG. 8 shows a flow diagram illustrating one example operation of an agricultural harvesting system architecture in performing harvest readiness monitoring and machine control.

FIG. 8 shows a flow diagram illustrating an example operation 800 of agricultural system 500 in performing harvest readiness monitoring and machine control.

At block 802, a drone 200 is controlled to detect crop loss in a measurement area associated with an unharvested crop plant. For example, control system 214 controls travel subsystem 252 to position the drone 200 to detect crop loss in the measurement area, such as based on an output of harvest readiness system 315 (e.g., measurement area identified by monitoring plan identification system 332). Further, at block 802, harvest readiness system 315 (e.g., harvest readiness identification system 334) generates a (first) crop loss value based on the crop loss detected in the measurement area at block 802.

At block 804, the drone 200 is controlled to exert a force on the crop plant. In one example, as indicated by block 806, exerting a force on the unharvested crop plant can include controlling drone 200 to bring a crop plant engaging component 271 (e.g., elongated member) into contact with the crop plant, such as by control system 214 controlling travel subsystem 252 to position the drone 200 or to control actuators 254 to extend the crop engaging component, or both. In one example, as indicated by block 808, exerting a force on the unharvested crop plant can include controlling drone 200 to cause a crop plant engaging component 271 (e.g., a fan) to direct a force (e.g., blown air) towards and against the unharvested crop plant, such as by control system 214 controlling an actuator 254 to controllably actuate (e.g., rotate) the crop engaging component 271 and, in some examples, control travel subsystem 252 to position the drone 200.

At block 810, the drone 200 is controlled to again detect crop loss in the measurement area associated with the unharvested crop plant. Further, at block 806, harvest readiness system 315 (e.g., harvest readiness identification system 334) generates a (second) crop loss value based on the crop loss detected in the measurement area at block 810.

At block 812, harvest readiness system 315 (e.g., harvest readiness identification system 334) generates a harvest readiness value (e.g., crop readiness value) corresponding to the crop plant based on the (first) crop loss value at block 802 and the (second) crop loss value at block 806. As indicated by block 814, determining the harvest readiness value can include a comparison of the first crop loss value and the second crop loss value, to determine a difference between the two. As indicated by block 816, determining the harvest readiness value can include comparing the first crop loss value, the second crop loss value, or the difference value (difference between the first crop loss value and the second crop loss value) to a threshold. As indicated by block 818, determining the harvest readiness value can include utilization of harvest readiness model (e.g. 340), such as a crop readiness model (e.g. 350), and providing the first crop loss value, the second crop loss value, or the difference value to the model.

In some examples, processing proceeds to block 820 where blocks 802, 804, 810, and 812 are repeated for each crop plant of one or more crop plants at the worksite, utilizing the same drone 200 or another drone 200.

Whether proceeding from block 812 or 820, processing proceeds at block 822 where one or more harvest readiness outputs 360 are generated by harvest readiness system 315, such as one or more drone operation plans, one or more harvest operation plans, and one or more harvest readiness values.

At block 824, system 500 (e.g., a control system 214 or a control system 414, or both) generates control signals based, at least, on the one or more harvest readiness outputs 360.

As indicated by block 826, control signals can be generated to control one or more interface mechanisms (e.g., one or more of an interface mechanism 218, 418, 618, or 364), such as to present (e.g., display etc.) the harvest readiness outputs or to present (e.g., display, etc.) information based on the harvest readiness outputs, such as to present one or more harvest readiness values, to present one or more drone operation plans (e.g., routes, etc.), to present one or more harvest operation plans (e.g., assignments, routes, operating parameters, etc.).

Alternatively, or additionally, as indicated by block 828, control signals can be generated to control one or more controllable subsystems (e.g., one or more of a controllable subsystem 216, a controllable subsystem 416, or a controllable subsystem 616). For example, a control system 214 can generate one or more control signals to control one or more controllable subsystems 216 based on the one or more harvest readiness outputs (e.g., a drone operation plan). A control system 414 can generate one or more control signals to control one or more controllable subsystems 416 based on a harvest readiness output (e.g., a harvest operation plan). A control system 614 can generate one or more control signals to control one or more controllable subsystems 616 based on a harvest readiness output (e.g., a harvest operation plan).

Alternatively, or additionally, as indicated by block 830, control signals can be generated to control various other items of system 500.

Figure 9:
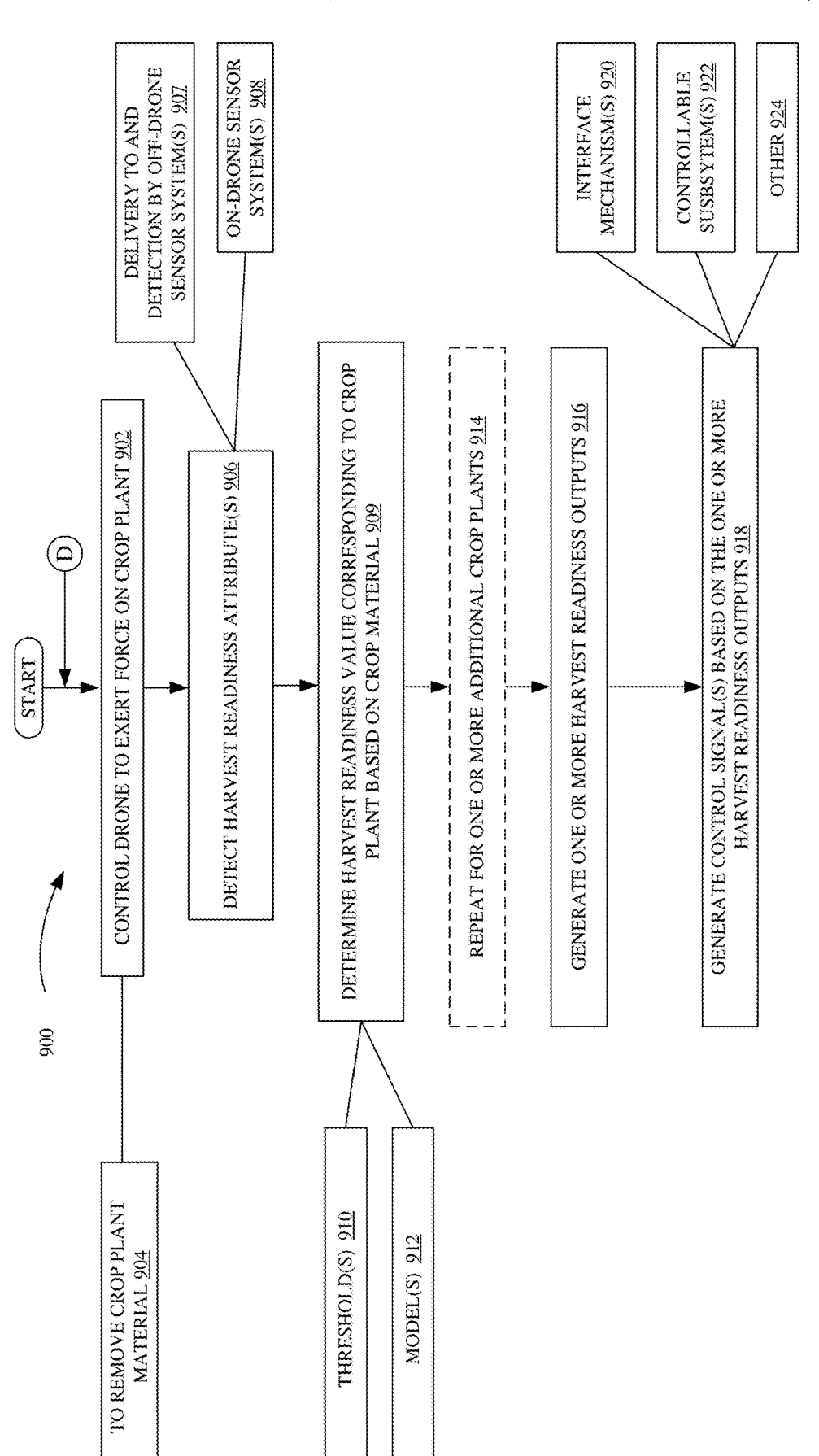
FIG. 9 shows a flow diagram illustrating one example operation of an agricultural harvesting system architecture in performing harvest readiness monitoring and machine control.

FIG. 9 shows a flow diagram illustrating an example operation 900 of agricultural system 500 in performing harvest readiness monitoring and control based thereon.

At block 902, a drone 200 is controlled to exert a force on the crop plant. As indicated by block 904, exerting a force on the unharvested crop plant can include controlling drone 200 to bring a crop plant engaging component 271 (e.g., gripper tool) into contact with the crop plant, such as by control system 214 controlling travel subsystem 252 to position the drone or to control actuators 254 to controllably move the crop plant engagement component, or both. As indicated by block 904, the crop plant engaging component 271 (e.g., gripper tool) is used to grab crop plant material (e.g., head, ear, pod, commodity, leaf, stalk material, etc.) of the crop plant and to remove the crop plant material. As indicated by block 904, exerting a force on the unharvested crop plant can include controlling a drone 200, and an associated crop plant engaging component (e.g., vacuum tool), to apply a vacuum suction force to the crop plant, such as by control system 214 controlling travel subsystem 252 to position the drone 200 or to control actuators 254 to generate the vacuum suction, or both. As indicated by block 904, the crop plant engaging component 271 (e.g., vacuum tool) is used to remove the crop plant material (e.g., head, ear, pod, commodity, leaf, stalk material, etc.) of the crop plant.

At block 906, the removed crop plant material is detected by harvest readiness sensors to detect one or more harvest readiness attributes. In one example, as indicated by block 907, the removed crop plant material is provided to harvest readiness sensors off-board the drone 200, such as a remote harvest readiness sensor system 520 or harvest readiness sensors on another machine (e.g., harvest readiness sensors (e.g., 427, 409, etc.) on-board a harvester 100). Providing the crop plant material to the remote harvest readiness sensor system 520, can include control system 214 controlling travel subsystem 252 to cause the drone to travel to a delivery location (e.g., associated with the remote harvest readiness sensor system 520 or associated with a user, or both). In some examples, a user, having received the crop plant material at the delivery location or having retrieved the crop plant material at the delivery location, can provide the crop plant material to the remote harvest readiness system 520. Further, at block 906, the remote harvest readiness sensor system 520 detect the crop plant material to detect a value of each of one or more harvest readiness attributes (e.g., a value of each of one or more crop plant readiness attributes). Providing the crop plant material to the remote harvest readiness sensors on-board another machine (e.g., harvester 100, etc.) can include control system 214 controlling travel subsystem 252 to cause the drone to travel to delivery location (e.g., associated with the other machine (e.g., harvester 100) or associated with a user/operator, or both). In some examples, a user/operator, having received the crop plant material at the delivery location or having retrieved the crop plant material at the delivery location, can provide the crop plant material to the harvest readiness sensors on-board the other machine (e.g., harvester 100).

At block 908, harvest readiness system 315 (e.g., harvest readiness identification system 334) generates a harvest readiness value (e.g., crop readiness value) corresponding to the crop plant based on the one or more detected harvest readiness attribute values detected at block 906. As indicated by block 910, determining the harvest readiness value can include comparing each of the one or more harvest readiness attributes values to a corresponding threshold. As indicated by block 912, determining the harvest readiness value can include utilization of harvest readiness model (e.g. 340), such as a crop readiness model (e.g. 350), and providing the one or more detected harvest readiness attribute values as inputs.

In some examples, processing proceeds to block 914 where blocks 902, 906, and 908 are repeated for each crop plant of one or more crop plants at the worksite, utilizing the same drone 200 or another drone 200.

Whether proceeding from block 908 or 914, processing proceeds at block 916 where one or more harvest readiness outputs 360 are generated by harvest readiness system 315, such as one or more drone operation plans, one or more harvest operation plans, and one or more harvest readiness values.

At block 918, system 500 (e.g., a control system 214 or a control system 414, or both) generates control signals based, at least, on the one or more harvest readiness outputs 360.

As indicated by block 920, control signals can be generated to control one or more interface mechanisms (e.g., one or more of an interface mechanism 218, 418, 618, or 364), such as to present (e.g., display etc.) the harvest readiness outputs or to present (e.g., display, etc.) information based on the harvest readiness outputs, such as to present one or more harvest readiness values, to present one or more drone operation plans (e.g., routes, etc.), to present one or more harvest operation plans (e.g., assignments, routes, operating parameters, etc.).

Alternatively, or additionally, as indicated by block 922, control signals can be generated to control one or more controllable subsystems (e.g., one or more of a controllable subsystem 216 or a controllable subsystem 416). For example, a control system 214 can generate one or more control signals to control one or more controllable subsystems 216 based on the one or more harvest readiness outputs (e.g., a drone operation plan). A control system 414 can generate one or more control signals to control one or more controllable subsystems 416 based on a harvest readiness output (e.g., a harvest operation plan). A control system 614 can generate one or more control signals to control one or more controllable subsystems 616 based on a harvest readiness output (e.g., a harvest operation plan).

Alternatively, or additionally, as indicated by block 924, control signals can be generated to control various other items of system 500.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms can include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition can be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores can be local to the systems accessing the data stores, one or more of the data stores can all be located remote form a system utilizing the data store, or one or more data stores can be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality can be distributed among more components. In different examples, some functionality can be added, and some can be removed.

It will be noted that the above discussion has described a variety of different systems, models, logic, controllers, components, and interactions. It will be appreciated that any or all of such systems, models, logic, controllers, components, and interactions can be implemented by hardware items, such as one or more processors, one or more processors executing computer executable instructions stored in memory, memory, or other processing components, some of which are described below, that perform the functions associated with those systems, logic, controllers, components, or interactions. In addition, any or all of the systems, models, logic, controllers, components, and interactions can be implemented by software that is loaded into a memory and is subsequently executed by one or more processors or one or more servers or other computing component(s), as described below. Any or all of the systems, models, logic, controllers, components, and interactions can also be implemented by different combinations of hardware, software, firmware, etc., some examples of which are described below. These are some examples of different structures that can be used to implement any or all of the systems, models, logic, controllers, components, and interactions described above. Other structures can be used as well.

Figure 10:
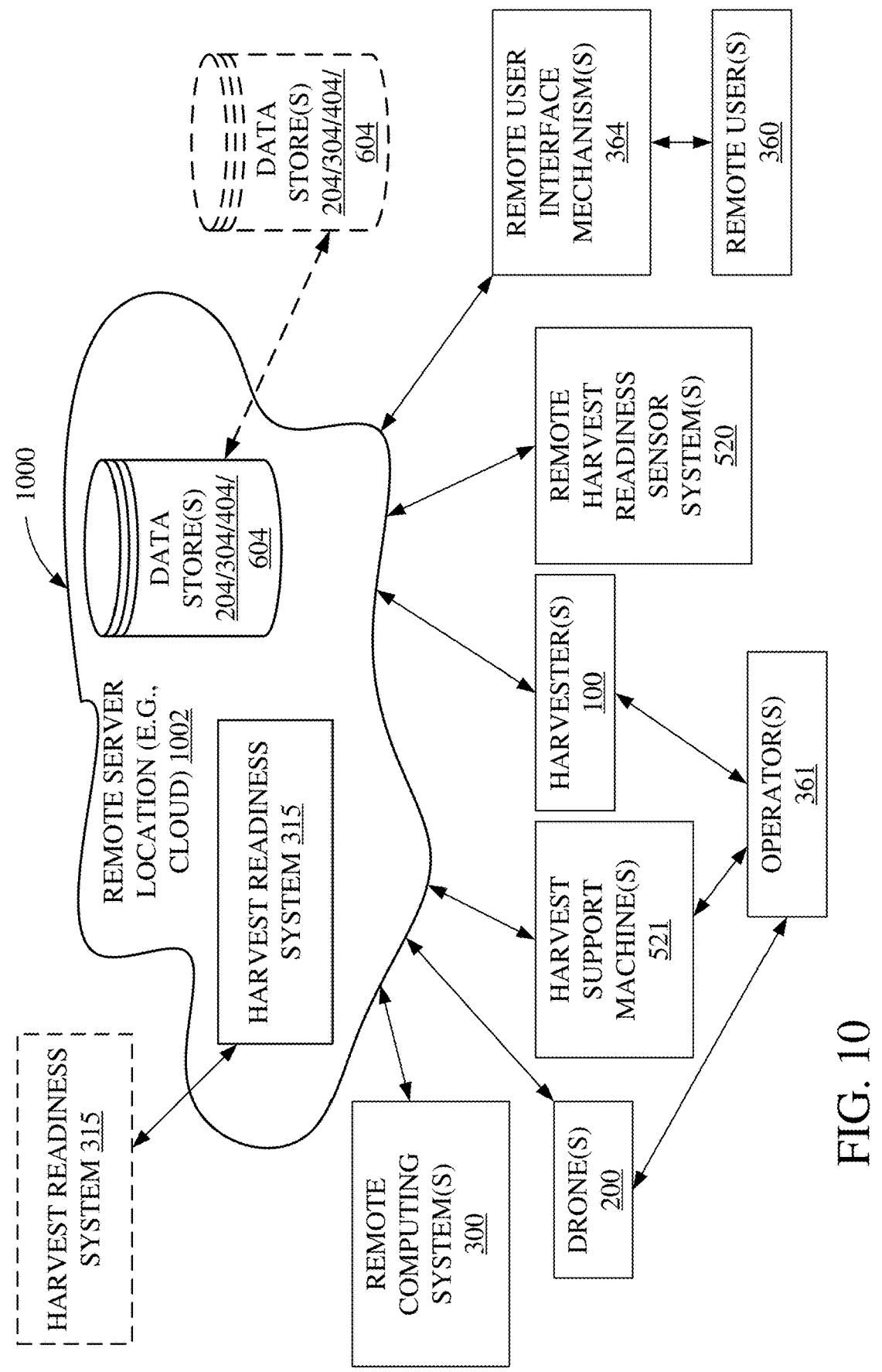
FIG. 10 is a block diagram showing one example of items of an agricultural harvesting system architecture in communication with a remote server architecture.

FIG. 10 is a block diagram of a remote server architecture 1000. FIG. 10, also shows one or more harvesters 100, one or more drones 200, one or more harvest support machines 521, one or more remote computing systems 300, one or more remote user interface mechanisms 364, and one or more remote harvest readiness sensor systems 520, in communication with the remote server environment. The harvesters 100, drones 200, harvest support machines 521, remote computing systems 300, remote user interface mechanisms 364, remote harvest readiness sensors systems 520 communicate with elements in a remote server architecture 1000. In some examples, remote server architecture 1000 provides computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and can be accessible through a web browser or any other computing component. Software or components shown in previous figures as well as data associated therewith, can be stored on servers at a remote location. The computing resources in a remote server environment can be consolidated at a remote data center location, or the computing resources can be dispersed to a plurality of remote data centers. Remote server infrastructures can deliver services through shared data centers, even though the services appear as a single point of access for the user. Thus, the components and functions described herein can be provided from a remote server at a remote location using a remote server architecture. Alternatively, the components and functions can be provided from a server, or the components and functions can be installed on client devices directly, or in other ways.

In the example shown in FIG. 10, some items are similar to those shown in previous figures and those items are similarly numbered. FIG. 10 specifically shows that harvest readiness system 315, data stores 204, data stores 304, data stores 404, or data stores 604, or a combination thereof, can be located at a server location 1002 that is remote from the harvesters 100, drones 200, harvest support machines 521, remote computing systems 300, remote user interface mechanisms 364, remote harvest readiness sensors systems 520. Therefore, in the example shown in FIG. 10, harvesters 100, drones 200, harvest support machines 521, remote computing systems 300, remote user interface mechanisms 364, remote harvest readiness sensors systems 520 access systems through remote server location 1002. In other examples, various other items can also be located at server location 1002, such as various other items of agricultural harvesting system architecture 500.

FIG. 10 also depicts another example of a remote server architecture. FIG. 10 shows that some elements of previous figures can be disposed at a remote server location 1002 while others can be located elsewhere. By way of example, one or more of data store(s) 204, 304, 404, or 604 can be disposed at a location separate from location 1002 and accessed via the remote server at location 1002. Similarly, harvest readiness system 315 can be disposed at a location separate from location 1002 and accessed via the remote server at location 1002. Regardless of where the elements are located, the elements can be accessed directly by harvesters 100, drones 200, harvest support machines 521, remote computing systems 300, remote user interface mechanisms 364, remote harvest readiness sensors systems 520 through a network such as a wide area network or a local area network; the elements can be hosted at a remote site by a service; or the elements can be provided as a service or accessed by a connection service that resides in a remote location. Also, data can be stored in any location, and the stored data can be accessed by, or forwarded to, operators, users, or systems. For instance, physical carriers can be used instead of, or in addition to, electromagnetic wave carriers. In some examples, where wireless telecommunication service coverage is poor or nonexistent, another machine, such as a fuel truck or other mobile machine or vehicle, can have an automated, semi-automated or manual information collection system. As a mobile machine (e.g., harvester 100, drone 200, harvest support machine 521) comes close to the machine containing the information collection system, such as a fuel truck prior to fueling, or other mobile machine or vehicle, the information collection system collects the information from the mobile machine (e.g., harvester 100, drone 200, harvest support machine 521) using any type of ad-hoc wireless connection. The collected information can then be forwarded to another network when the machine containing the received information reaches a location where wireless telecommunication service coverage or other wireless coverage is available. For instance, a fuel truck, can enter an area having wireless communication coverage when traveling to a location to fuel other machines or when at a main fuel storage location. Other mobile machines or vehicles can enter an area having wireless communication coverage when traveling to other locations or when at another location. All of these architectures are contemplated herein. Further, the information can be stored on a mobile machine (e.g., harvester 100, drone 200, harvest support machine 521) until the mobile machine enters an area having wireless communication coverage. The mobile machine (e.g., harvester 100, drone 200, harvest support machine 521), itself, can send the information to another network.

It will also be noted that the elements of previous figures, or portions thereof, can be disposed on a wide variety of different devices. One or more of those devices can include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 can include cybersecurity measures. Without limitation, these measures can include encryption of data on storage devices, encryption of data sent between network nodes, authentication of people or processes accessing data, as well as the use of ledgers for recording metadata, data, data transfers, data accesses, and data transformations. In some examples, the ledgers can be distributed and immutable (e.g., implemented as blockchain).

Figure 11:
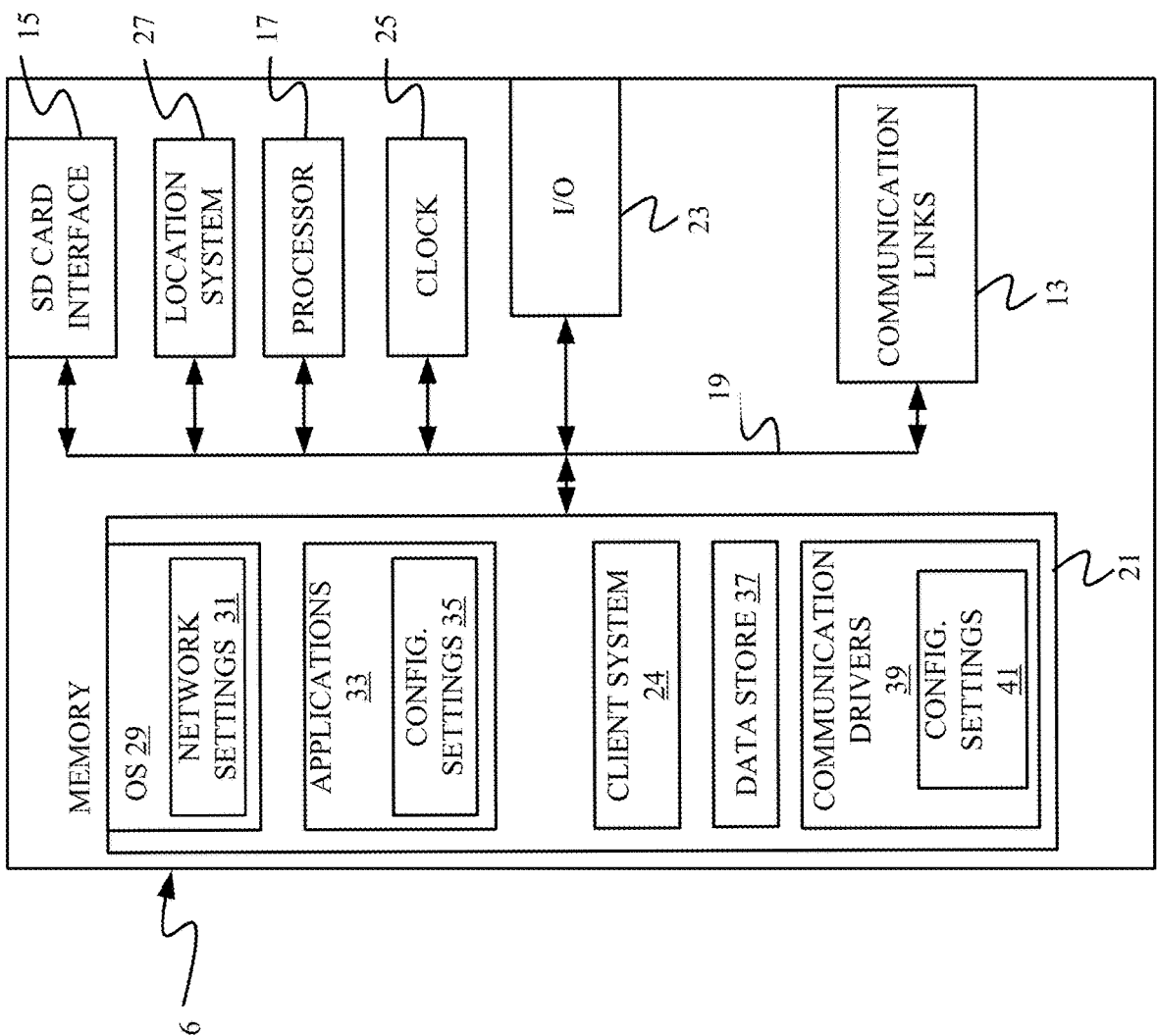
FIGS. 11, 12, and 13 show examples of mobile devices that can be used in an agricultural harvesting system architecture.
Figure 12:
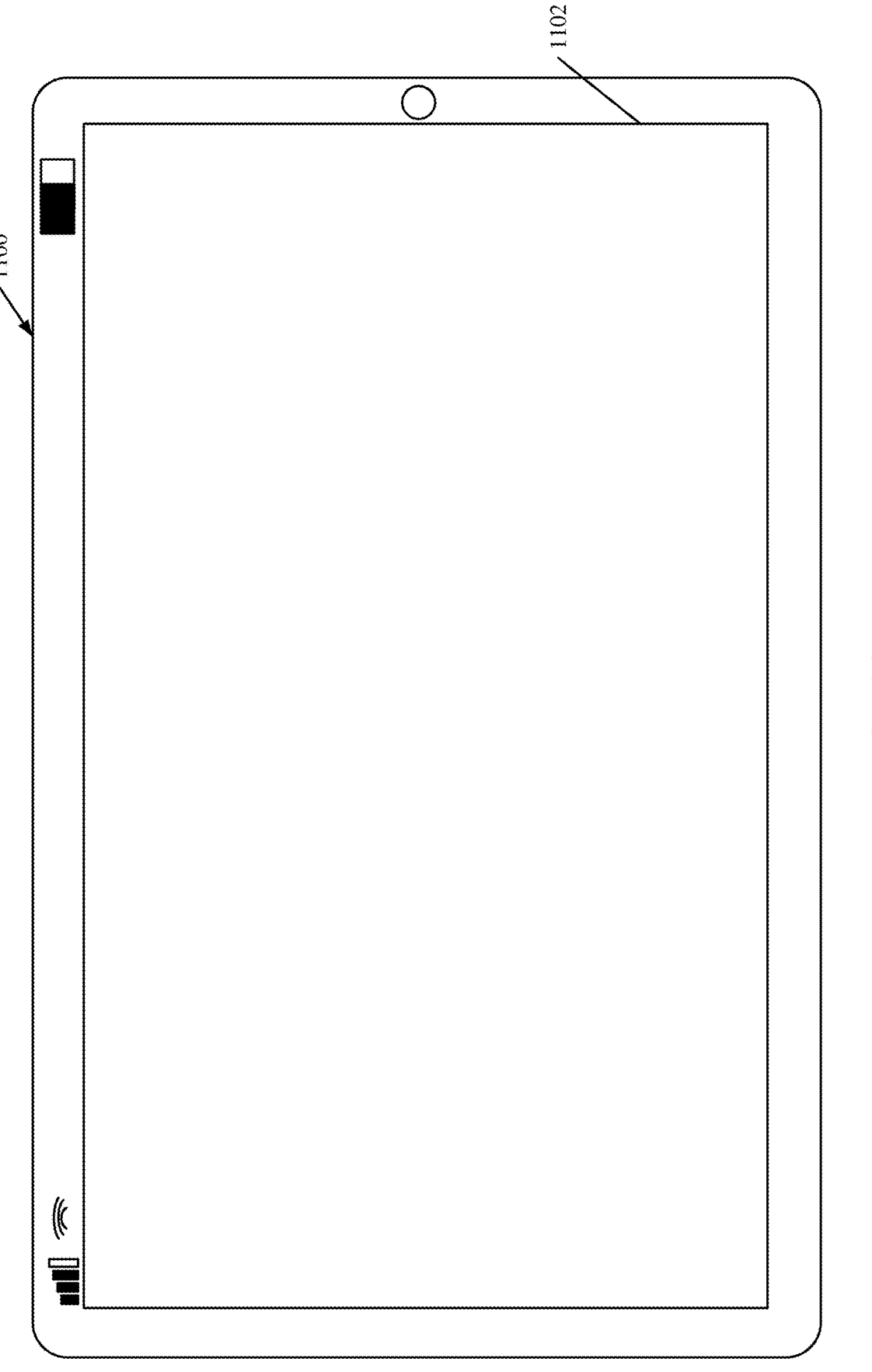
Figure 13:
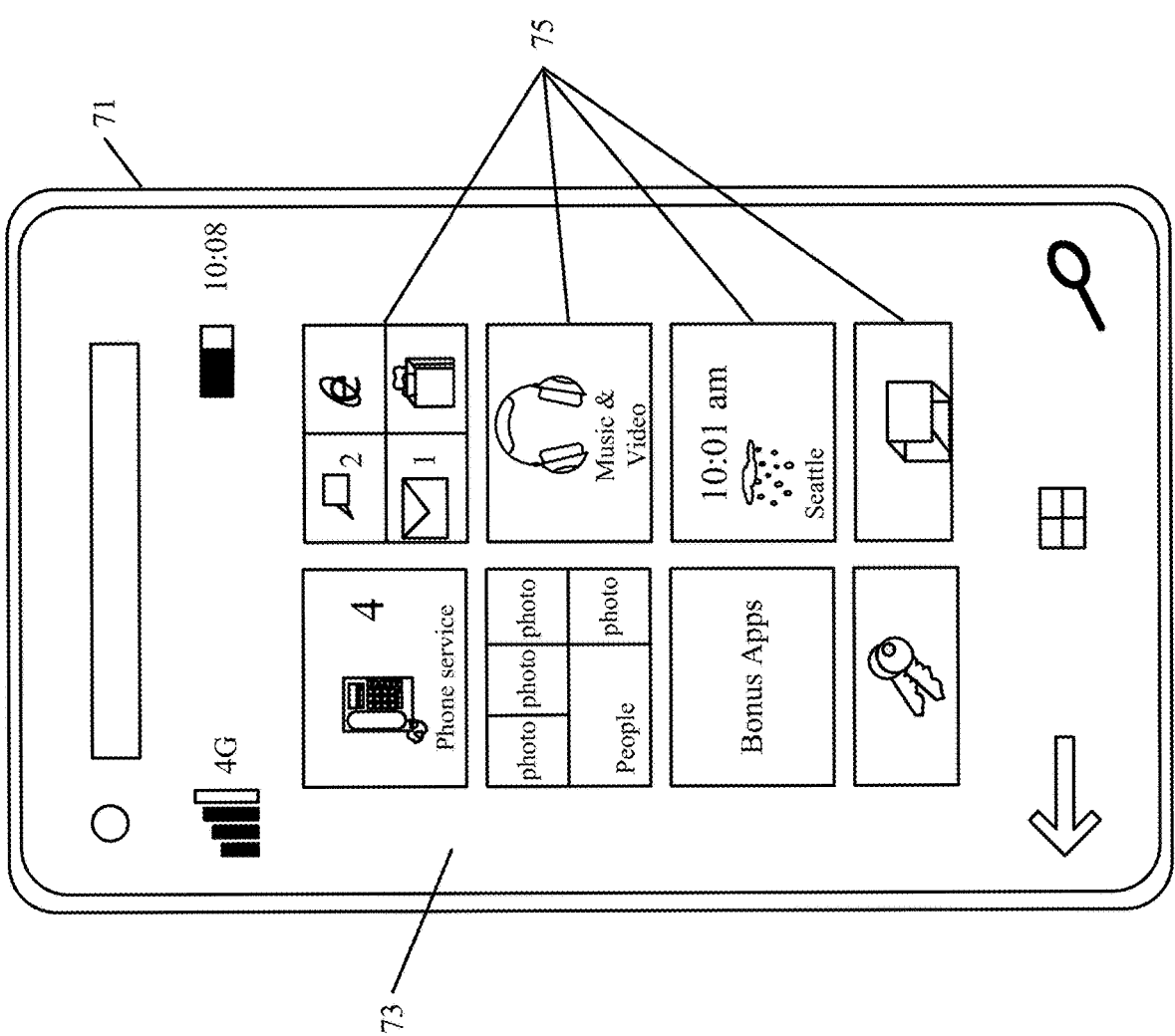

FIG. 11 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., harvester 100 or harvest support machine 521) or can be communicably coupled to a mobile machine (e.g., harvester 100, drone 200, or harvest support machine 521) for use in generating, processing, or displaying the outputs (e.g., 360) discussed above. FIGS. 12 and 13 are examples of handheld or mobile devices.

FIG. 11 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, client system 24, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one example in which device 16 is a tablet computer 1100. In FIG. 12, computer 1100 is shown with user interface display screen 1102. Screen 1102 can be a touch screen or a pen-enabled interface that receives inputs from a pen or stylus. Tablet computer 1100 can also use an on-screen virtual keyboard. Of course, computer 1100 can also be attached to a keyboard or other user input device through a suitable attachment mechanism, such as a wireless link or USB port, for instance. Computer 1100 can also illustratively receive voice inputs as well.

FIG. 13 is similar to FIG. 12 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
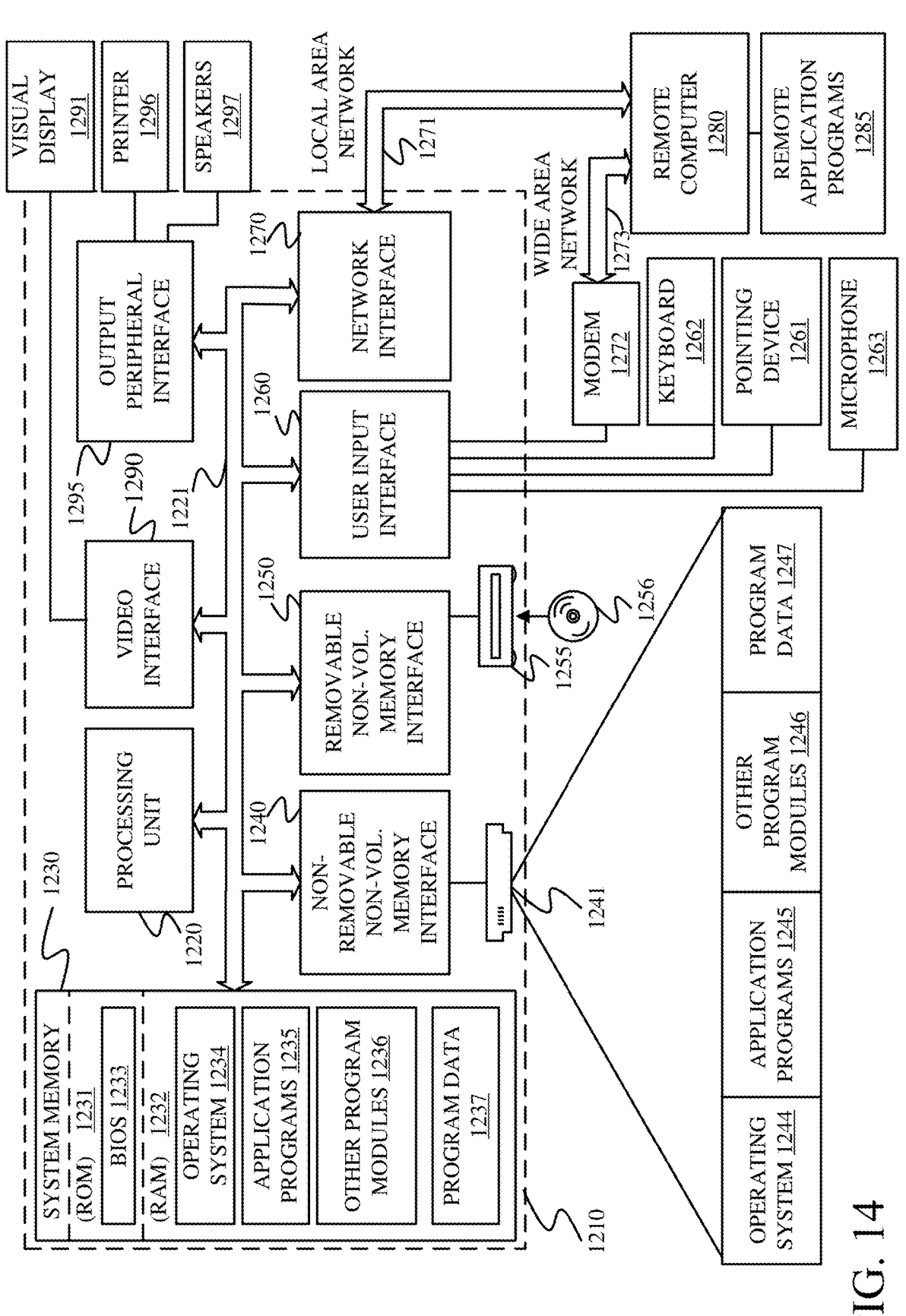
FIG. 14 is a block diagram showing one example of a computing environment that can be used in an agricultural harvesting system architecture.

FIG. 14 is one example of a computing environment in which elements of previous figures described herein can be deployed. With reference to FIG. 14, an example system for implementing some embodiments includes a computing device in the form of a computer 1210 programmed to operate as discussed above. Components of computer 1210 can include, but are not limited to, a processing unit 1220 (which can comprise processors or servers from previous figures), a system memory 1230, and a system bus 1221 that couples various system components including the system memory to the processing unit 1220. The system bus 1221 can be any of several types of bus structures including a memory bus or memory controller, a peripheral bus, and a local bus using any of a variety of bus architectures. Memory and programs described with respect to previous figures described herein can be deployed in corresponding portions of FIG. 14.

Computer 1210 typically includes a variety of computer readable media. Computer readable media can be any available media that can be accessed by computer 1210 and includes both volatile and nonvolatile media, removable and non-removable media. By way of example, and not limitation, computer readable media can comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media can embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 14 illustrates operating system 1234, application programs 1235, other program modules 1236, and program data 1237.

The computer 1210 can also include other removable/non-removable volatile/nonvolatile computer storage media. By way of example only, FIG. 14 illustrates a hard disk drive 1241 that reads from or writes to non-removable, nonvolatile magnetic media, an optical disk drive 1255, and non-volatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 1210. In FIG. 14, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user can enter commands and information into the computer 1210 through input devices such as a keyboard 1262, a microphone 1263, and a pointing device 1261, such as a mouse, trackball or touch pad. Other input devices (not shown) can include a joystick, game pad, satellite dish, scanner, or the like. These and other input devices are often connected to the processing unit 1220 through a user input interface 1260 that is coupled to the system bus, but can be connected by other interface and bus structures. A visual display 1291 or other type of display device is also connected to the system bus 1221 via an interface, such as a video interface 1290. In addition to the monitor, computers can also include other peripheral output devices such as speakers 1297 and printer 1296, which can be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules can be stored in a remote memory storage device. FIG. 14 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:
  a drone controllable to exert force on a crop plant at a worksite;
  one or more harvest readiness sensors configured to detect one or more harvest readiness attributes of the crop plant;
  one or more processors; and
  memory storing instructions, executable by the one or more processors, that, when executed by the one or more processors, configure the one or more processors to:
    obtain first harvest readiness sensor data, generated by the one or more harvest readiness sensors, indicative of the one or more harvest readiness attributes of the crop plant;

after the first harvest readiness sensor data is generated by the one or more harvest readiness sensors, control the drone to exert force on the crop plant;

obtain second harvest readiness sensor data, generated by the one or more harvest readiness sensors, indicative of the one or more harvest readiness attributes of the crop plant after the drone is controlled to exert force on the crop plant; and identify a harvest readiness value corresponding to the worksite based on the first harvest readiness sensor data and the second harvest readiness sensor data.

2. The agricultural system of claim 1, wherein the drone includes a removal tool configured to separate material from the crop plant and wherein the instructions, when executed by the one or more processors, configure the one or more processors to:

control the drone to exert force on the crop plant by controlling the drone to exert the force on the crop plant with the removal tool to separate material from the crop plant.

3. The agricultural system of claim 2, wherein the one or more harvest readiness sensors are remote from the drone and wherein the instructions, when executed by the one or more processors, configure the one or more processors to:

control the drone to transport the material from the crop plant to a delivery location;

wherein the one or more harvest readiness sensors are configured to sense the material from the crop plant to detect the one or more harvest readiness attributes.

4. The agricultural system of claim 1, wherein the drone includes the one or more harvest readiness sensors, wherein the drone includes a crop engaging component, and wherein the instructions, when executed by the one or more processors, configure the one or more processors to:

control the drone to exert force on the crop plant by controlling the drone to bring the crop engaging component into contact with the crop plant; and detect, with the one or more harvest readiness sensors, the one or more harvest readiness attributes in a measurement area associated with the crop plant after the crop engaging component is brought into contact with the crop plant, the second harvest readiness sensor data indicative of the one or more harvest readiness attributes detected in the measurement area after the crop engaging component is brought into contact with the crop plant.

5. The agricultural system of claim 4, and wherein the instructions, when executed by the one or more processors, configure the one or more processors to:

control the drone to detect, with the one or more harvest readiness sensors, the one or more harvest readiness attributes in the measurement area before the crop engaging component is brought into contact with the crop plant, the one or more harvest readiness sensors configured to generate the first harvest readiness sensor data indicative of the one or more harvest readiness attributes before the crop engaging component is brought into contact with the crop plant.

6. The agricultural system of claim 1, wherein the drone includes the one or more harvest readiness sensors, wherein the drone includes an air stream generator, and wherein the instructions, when executed by the one or more processors, configure the one or more processors to:

control the drone to exert force on the crop plant by controlling the drone to direct an air stream generated by the air stream generator towards the crop plant; and control the drone to detect, with the one or more harvest readiness sensors, the one or more harvest readiness attributes after the air stream is directed towards the crop plant, the second harvest readiness sensor data indicative of the one or more harvest readiness attributes after the air stream is directed towards the crop plant.

7. The agricultural system of claim 6, and wherein the instructions, when executed by the one or more processors, configure the one or more processors to:

control the drone to detect, with the one or more harvest readiness sensors, the one or more harvest readiness attributes before the air stream is generated towards the crop plant, the one or more harvest readiness sensors configured to generate the first harvest readiness sensor data indicative of the one or more harvest readiness attributes before the air stream is generated towards the crop plant.

8. The agricultural system of claim 1, wherein the instructions, when executed by the one or more processors, further configure the one or more processors to:

generate, based on the harvest readiness value, a harvester operation plan for use in control of one or more of a harvester or a harvest support machine.

9. A computer implemented method of harvest readiness monitoring comprising:

controlling a drone to exert force on a crop plant at a worksite;

detecting, with one or more harvest readiness sensors, one or more harvest readiness attributes after exertion of force on the crop plant and generating harvest readiness sensor data indicative of the one or more harvest readiness attributes; and identifying a harvest readiness value corresponding to the worksite based on the harvest readiness sensor data, wherein controlling the drone to exert force on the crop plant comprises controlling the drone to bring a crop engaging component into contact with the crop plant, wherein detecting, with the one or more harvest readiness sensors, comprises detecting, with the one or more harvest readiness sensors, the one or more harvest readiness attributes in a measurement area associated with the crop plant after the crop engaging component is brought into contact with the crop plant, wherein generating the harvest readiness sensor data comprises generating the harvest readiness sensor data indicative of the one or more harvest readiness attributes detected in the measurement area after the crop engaging component is brought into contact with the crop plant, and further comprising:

detecting, with the one or more harvest readiness sensors, the one or more harvest readiness attributes in the measurement area before the crop engaging component is brought into contact with the crop plant and generating additional harvest readiness sensor data indicative of the one or more harvest readiness attributes detected in the measurement area before the crop engaging component is brought into contact with the crop plant; and wherein identifying the harvest readiness value comprises identifying the harvest readiness value based on the harvest readiness sensor data and the additional harvest readiness sensor data.

10. The computer implemented method of claim 9, wherein controlling the drone to exert force on the crop plant comprises controlling the drone to direct an air stream towards the crop plant, wherein detecting, with the one or more harvest readiness sensors, comprises detecting, with the one or more harvest readiness sensors, the one or more harvest readiness attributes in a measurement area associated with the crop plant after the air stream is directed towards the crop plant, wherein generating the harvest readiness sensor data comprises generating the harvest readiness sensor data indicative of the one or more harvest readiness attributes detected in the measurement area after the air stream is directed towards the crop plant, and wherein the additional harvest readiness sensor data indicative of the one or more harvest readiness attributes is detected in the measurement area before the air stream is directed towards the crop plant.

11. The computer implemented method of claim 9 and further comprising:

generating, based on the harvest readiness value, a harvest operation plan including one or more of: (i) a route; (ii) an assignment; or (iii) operating parameters of a work machine; and controlling one or more controllable subsystems of the work machine based on the harvest operation plan.

12. A drone comprising:

a crop engaging component configured to exert force on a crop plant at a worksite for detection of one or more harvest readiness attributes, wherein the crop engaging component comprises an air stream generator; and one or more actuators controllable to cause the crop engaging component to exert force on the crop plant, wherein the one or more actuators are controllable to cause the air stream generator to exert force on the crop plant by causing the air stream generator to direct an air stream towards the crop plant.

13. The drone of claim 12 and further comprising:

one or more harvest readiness sensors configured to detect the one or more harvest readiness attributes after exertion of force on the crop plant and to generate harvest readiness sensor data indicative of the one or more harvest readiness attributes.

14. The drone of claim 12, wherein the one or more actuators are controllable to cause the crop engaging component to exert force on the crop plant by causing the crop engaging component to contact the crop plant.

15. The drone of claim 12, wherein the crop engaging component comprises a removal tool configured to separate material from the crop plant and wherein the one or more actuators are controllable to cause the removal tool to exert force on the crop plant to separate material from the crop plant.

16. The computer implemented method of claim 9, wherein controlling the drone to exert force on the crop plant comprises controlling the drone to exert the force on the crop plant using a removal tool of the drone to separate material from the crop plant.

17. The computer implemented method of claim 16 and further comprising: controlling the drone to transport the material from the crop plant to a delivery location, and wherein detecting, with the one or more harvest readiness sensors, comprises detecting, with the one or more harvest readiness sensors, remote from the drone, the material from the crop plant.

18. The agricultural system of claim 1, wherein the one or more harvest readiness attributes of the crop plant comprises a crop loss in a measurement area.

19. The agricultural system of claim 18, wherein the first harvest readiness sensor data comprises a first crop loss in the measurement area and the second harvest readiness sensor data comprises a second crop loss in the measurement area.

20. The agricultural system of claim 19, wherein the instructions, when executed by the one or more processors, configure the one or more processors to:

identify the harvest readiness value based on a difference between the first crop loss and the second crop loss.

21. The agricultural system of claim 20, wherein the instructions, when executed by the one or more processors, configure the one or more processors to:

identify the harvest readiness value based on a comparison of the difference, between the first crop loss and the second crop loss, to a threshold.

* * * * *